(12) United States Patent
Koti

(10) Patent No.: US 11,894,709 B2
(45) Date of Patent: Feb. 6, 2024

(54) METHODS AND SYSTEMS FOR MANAGING AND IMPLEMENTING STATE-OF-HEALTH TO CONTROL LIFESPAN OF A FUEL CELL

(71) Applicant: CUMMINS INC., Columbus, IN (US)

(72) Inventor: Archit Koti, Sunnyvale, CA (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/591,031

(22) Filed: Feb. 2, 2022

(65) Prior Publication Data

US 2022/0393483 A1 Dec. 8, 2022

Related U.S. Application Data

(60) Provisional application No. 63/196,044, filed on Jun. 2, 2021.

(51) Int. Cl.
| | |
|---|---|
| *B60L 50/72* | (2019.01) |
| *B60L 58/33* | (2019.01) |
| *H01M 8/0432* | (2016.01) |
| *H01M 8/04858* | (2016.01) |
| *H01M 8/04992* | (2016.01) |
| *H02J 7/00* | (2006.01) |
| *H01M 8/12* | (2016.01) |

(52) U.S. Cl.
CPC ......... *H02J 7/005* (2020.01); *H01M 8/04932* (2013.01); *H02J 7/007* (2013.01); *H02J 7/0013* (2013.01); *H02J 7/00032* (2020.01); *H01M 2008/1293* (2013.01); *H01M 2250/20* (2013.01); *H02J 2300/30* (2020.01)

(58) Field of Classification Search
CPC ...... H02J 7/005; H02J 7/00032; H02J 7/0013; H02J 7/007; H02J 2300/30; H01M 8/04932; H01M 2008/1293; H01M 2250/20; H01M 8/04313; H01M 10/48; H01M 2008/1095; H01M 2220/20; H01M 8/0494; H01M 8/04947; H01M 8/04694; Y02E 60/50
USPC ......................................................... 307/10.1
See application file for complete search history.

(56) References Cited

U.S. PATENT DOCUMENTS

| | | | |
|---|---|---|---|
| 6,691,095 B2 | 2/2004 | Singh | |
| 8,450,020 B2 | 5/2013 | Sinha | |
| 8,907,675 B2 | 12/2014 | Phlippoteau | |
| 9,889,752 B2 | 2/2018 | Zhou | |
| 2008/0299420 A1* | 12/2008 | Kelley | H01M 8/04126 429/429 |
| 2012/0175959 A1* | 7/2012 | Strom | H01M 8/04589 307/77 |
| 2013/0090900 A1* | 4/2013 | Gering | G01R 31/392 703/2 |
| 2015/0021992 A1 | 1/2015 | Toya | |
| 2016/0052505 A1* | 2/2016 | Zhou | B60W 20/10 903/930 |

(Continued)

FOREIGN PATENT DOCUMENTS

| | | |
|---|---|---|
| CN | 110077282 | 8/2019 |
| DE | 102017200205 | 7/2018 |

(Continued)

*Primary Examiner* — Daniel Cavallari
*Assistant Examiner* — Xuan Ly
(74) *Attorney, Agent, or Firm* — Barnes & Thornburg LLP

(57) ABSTRACT

The present disclosure relates to a method and system for determining, applying, and/or managing the state-of-health of fuel cell to control the lifespan of the fuel cell in a vehicle and/or powertrain.

19 Claims, 4 Drawing Sheets

(56) References Cited

U.S. PATENT DOCUMENTS

2018/0269541 A1     9/2018   Kobayashi et al.
2020/0160619 A1*   5/2020   Wang ..................... G06N 20/00
2021/0313605 A1*   10/2021   Lee ..................... H01M 8/0491

FOREIGN PATENT DOCUMENTS

| EP | 3503274 | 5/2020 |
|----|---------|--------|
| JP | 2011181198 | 9/2011 |
| KR | 101155111 | 6/2012 |

* cited by examiner

METHODS AND SYSTEMS FOR MANAGING AND IMPLEMENTING STATE-OF-HEALTH TO CONTROL LIFESPAN OF A FUEL CELL

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/196,044 filed on Jun. 2, 2021, the entire disclosure of which is hereby expressly incorporated herein by reference.

TECHNICAL FIELD

The present disclosure relates to a method and system for determining, applying, and/or managing the state-of-health of fuel cell to control the lifespan of the fuel cell in a vehicle and/or powertrain.

BACKGROUND

Fuel cells are known for their efficient use of fuel to develop direct current (DC). Certain fuel cells, such as solid oxide fuel cells (SOFCs), operate in large-scale power systems that provide electricity to satisfy industrial and municipal needs. Other common types of fuel cells include phosphoric acid fuel cells (PAFCs), molten carbonate fuel cells (MCFCs), and proton exchange membrane fuel cells (PEMFCs), all generally named after their electrolytes. Many of these types of fuel cells are useful for powering smaller portable applications, such as cars, trucks, industrial equipment, and/or other types of vehicles or powertrains.

A fuel cell or fuel cell module produces electricity by electrochemically combining a fuel and an oxidant across an ionic conducting layer. Fuel cells are typically amassed in electrical series in an assembly of fuel cells to produce power at useful voltages or currents. Therefore, interconnected structures are used to connect or couple adjacent fuel cells in series or parallel to form a fuel cell stack or a fuel cell system.

Through normal operation, fuel cells and fuel cell modules, such as those used in vehicles and/or powertrains, continuously age, degrade, and/or deteriorate over time. Aging, degradation, and/or deterioration often reduce or prevent fuel cells from providing optimal power and/or efficiently operating over the lifetime or lifespan of the fuel cell. Current methods and systems to determine or predict fuel cell health (e.g., the state-of-health of a fuel cell) are conducted in manufacturer or laboratory settings and/or are based on limited information including, but not limited to, internal parameters about the fuel cell itself. These current methodologies or systems of estimating or predicting the state-of-health and/or lifespan of a fuel cell create complex problems, particularly related to unreliability and inaccuracy when those measurements are applied to real world application, such as on or during use of a vehicle and/or powertrain.

For these and other reasons, the present disclosure is directed to methods and systems for determining, applying, and/or managing the state-of-health and/or controlling the lifespan of a fuel cell in a vehicle and/or powertrain. Specifically, the present methods and systems enable estimation, prediction, utilization, management, and control of the state-of-health and lifespan of any fuel cell by dynamic operation of the fuel cell, such as in real-time and/or at the powertrain, power system, vehicle or drive level, such that any inputs and/or measurement data are ascertained and collected in real world conditions. In doing so, the present methods and systems provide increased confidence, reliability, and accuracy of the determination of state-of-health and lifespan prediction of a fuel cell, as integrated in an application and through its lifetime, which are further utilized by one or more controllers to enable increased utility, efficiency, and lifespan of fuel cell(s) and its operational performance.

SUMMARY

Embodiments of the present invention are included to meet these and other needs. The present disclosure is direted to a method of controlling the lifespan of a fuel cell. One embodiment of the present method comprises receiving one or more inputs into a processor, and generating a lifespan management and control strategy by the processor. The method of controlling the lifespan of a fuel cell also comprises communicating the lifespan management and control strategy by the processor to a power source controller. In addition, the method comprises controlling power output of one or more power sources by the power source controller, wherein the one or more power sources are selected from a fuel cell, a battery, and a combination thereof.

In one embodiment, the method comprises one or more power sources are situated on, configured to be located on, or attached to a vehicle or powertrain. In one embodiment of the present method, the vehicle or powertrain is an automoble, a truck, an aircraft, a vessel, a train, a locomotive, a bus, or mining equipment. In a further embodiment of the present method, the fuel cell is a solid oxide fuel cell or a proton exchange membrane fuel cell.

One embodiment of the present method comprises generating the lifespan management and control strategy comprises estimating the present state-of-health of the one or more power sources. In one embodiment, generating the lifespan management and control strategy comprises conducting an online-offline procedure. In a further embodiment, conducting the online-offline procedure comprises estimating a state-of-health of the one or more power sources.

In one embodiment of the present method, estimating the state-of-health of the one or more power sources comprises generating a trend line. In another embodiment of the present method, the trend line reflects the estimated lifespan of the one or more power sources. In a further embodiment of the present method, the lifespan management and control strategy comprises the one or more inputs, the state-of-health and the estimated lifespan of the one or more power sources. Finally, one embodiment of the present method, controlling the power output of the one or more power sources by the controller comprises delivering instructions to the one or more power sources.

The present disclosure is also related to a system for controlling the lifespan of a fuel cell. One embodiment of the system comprises: 1) a processor, 2) one or more real-time inputs, 3) a power source controller, and 4) one or more power sources. In an embodiment of the system, the one or more power sources are situated on, configured to be located on, or attached to a vehicle or powertrain.

In another embodiment, the processor receives the one or more inputs, uses the one or more inputs to generate a lifespan management and control strategy, and communicates the lifespan management and control strategy to the power source controller. In a further embodiment, the power source controller controls power output for the one or more power sources based on the lifespan management and control strategy.

In one embodiment of the present system, each of the one or more power sources includes a separate individual controller for controlling that power source. In another embodiment, the individual controllers for each of the one or more power sources separately cooperates with the power source controller to control the power output for the one or more power sources. In a further embodiment of the present system, the power output for the one or more power sources is driven by automated control. In another embodiment of the present system, the automated control of the power output of the one or more power sources is based on the lifespan management and control strategy.

In one embodiment of the present system, the vehicle or powertrain is an automobile, a truck, an aircraft, a vessel, a train, a locomotive, a bus, or mining equipment. Finally, in one embodiment of the present system, the fuel cell is a solid oxide fuel cell or a proton exchange membrane fuel cell.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
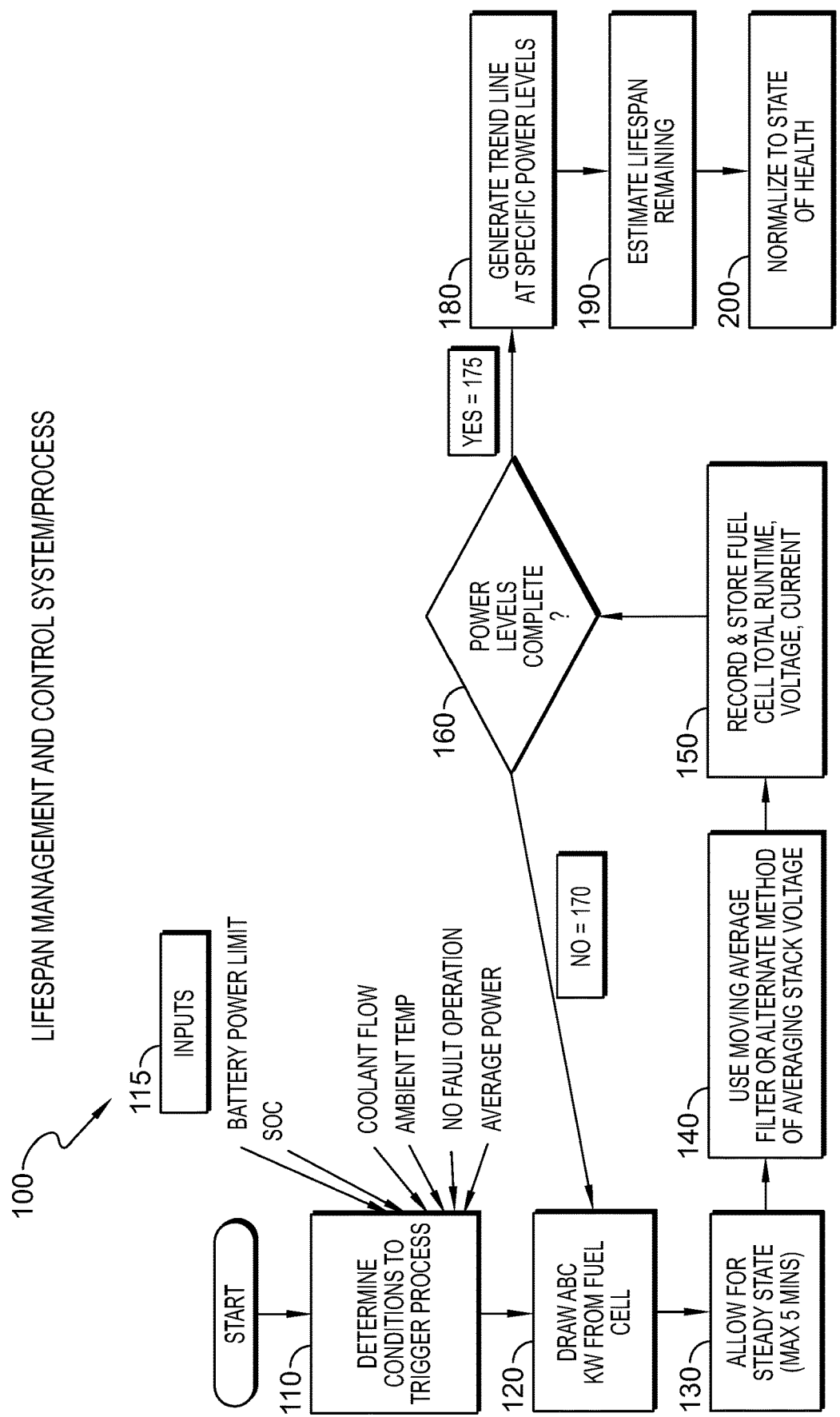
FIG. 1 is a block diagram of one embodiment of a method or system comprising a lifespan management and control strategy to determine the state-of-health and increase lifespan of a fuel cell.

The present disclosure relates to a method and a system (e.g., a control system) that includes determining, applying, managing, and/or controlling the state-of-health (SOH) and lifespan of a fuel cell in a vehicle and/or powertrain. More specifically, the present disclosure provides a method and system for predicting, estimating, managing, and/or utilizing state-of-health (SOH) and lifespan estimations of a fuel cell by applying a specific lifespan management and control strategy to preserve, maintain, and/or extend the SOH and/or lifespan of the fuel cell on the vehicle and/or powertrain. The method and system of the present disclosure also include generating the lifespan management and control strategy, based on operational, performance, and other input data ("inputs"), as well as the a state-of-health (SOH) and a lifespan, that is responsible for managing and controlling the power allocation or split in a vehicle and/or powertrain having one or more power sources.

In one embodiment, the vehicle and/or powertrain of the present disclosure may be a vessel, a marine vehicle or vessel, a train, a locomotive, a bus, a trolley, or a mining equipment. For example, a vehicle or powertrain of the present disclosure may be an automobile (e.g., a car), a truck, a vessel (e.g., a marine vessel), a train, a locomotive, a bus, or a mining equipment. In one embodiment, the vehicle and/or powertrain may be an equipment or a device used on rail, used on the waterways, used on-highways, used off-highways, used in high altitude regions, or used underground.

In one embodiment, the vehicle and/or powertrain may comprise or be attached to a vessel used in the air. For example, the vehicle and/or powertrain may be or attached to a plane, a helicopter, or other aircrafts or aerial crafts (e.g., a drone or a hot air balloon). In another embodiment, the vehicle and/or powertrain of the present system or method does not comprise a plane, a helicopter, or any aircraft, aerial craft, or other type of vessel used in the air.

A vehicle and/or powertrain of the present method or system may be powered by one or more of any type of fuel cells accompanied by one or more of any type of a power source/sink (e.g., high voltage battery, ultra capacitor, etc.). An illustrative power source of the vehicle and/or powertrain of the present method or system may include, but is not limited to a fuel cell, or a battery. Importantly, the present methods and systems may be applied to any brand or design of power source, such as any fuel cell, fuel cell stack, or a battery, regardless of the manufacturer or designer of the fuel cell or the vehicle and/or powertrain.

Notably, the present methods and systems may be applied to any new fuel cell and/or new battery that is physically located upon (e.g. installed on), configured to be attached to, or in contact with the vehicle and/or powertrain, such as a new or newly built vehicle and/or powertrain. The methods and systems may be applied to any fuel cell and/or battery to identify, utilize, and/or implement the inputs, internal parameters, and/or information that determines or defines the state-of-health and/or lifespan of the power source.

Further, the present methods and systems may be applied to any type of fuel cell, fuel cell stack or fuel cell system. For example, in one embodiment, a proton exchange membrane fuel cell (PEMFC) may be used with the present methods and systems. In another embodiment, a solid oxide fuel cell (SOFC) may be utilized by the present methods and systems. In addition, the present methods and systems may be applied to fuel cell systems or power generation systems comprising one or more, multiple, and/or a plurality of fuel cells, fuel cell stacks, and/or fuel cell modules in a system.

Another embodiment of the power source of the present method or system comprises a battery. Notably, the power source of the present method or system, must also be a "power sink," meaning that the power source can consume power as well as generate and output power. Accordingly, a power source of the present methods and systems does not comprise an engine, such as an internal combustion engine, a diesel engine, or a hydrogen powered engine, etc.

An exemplary power source of the vehicle and/or powertrain may be a hybrid power source. A hybrid power source of the present disclosure may include at least two different types of power sources (e.g., a fuel cell and a battery/supercapacitor, etc.). One embodiment of a hybrid power source of the vehicle and/or powertrain may include at least a fuel cell or a fuel cell stack. Another embodiment of a hybrid power source of the vehicle and/or powertrain may at least include a battery. Another exemplary embodiment of a hybrid power source of the vehicle and/or powertrain may at least include a fuel cell or fuel cell stack and a battery. Using a hybrid power source, such as a fuel cell or fuel cell stack/battery hybrid power source, independently and/or coupled with the present method and system (e.g.

control system), can result in the generation and application of a lifespan management and control strategy that provides management and control of the one or more power sources or power generation components (e.g., a fuel cell and a battery) of the vehicle and/or powertrain.

The present disclosure is directed to a method and a control system for generating a lifespan management and control strategy ("lifespan management and control strategy") that may be applied and/or implemented to one or more hybrid power sources (e.g., a fuel cell and/or a battery) of a vehicle and/or powertrain (see FIG. 1). In an exemplary embodiment, the present methods and control systems relate to an application or implementation of the lifespan management and control strategy and process to a power source (e.g., fuel cell and/or battery) that is physically located upon (e.g. installed on), situated on, configured to be attached to, or in contact with the vehicle and/or powertrain.

In such an embodiment, operational testing of the fuel cell and/or battery to estimate or predict the state-of-health, age, and/or lifespan of the power source may be performed at the vehicle and/or powertrain level such that indirect testing through other means is not required. Operational testing of the power source at the vehicle and/or powertrain level such that any need for direct testing of the at power source level or directly on the power source is also not required. As such, utilization and implementation of the present methods and systems are advantageous in that they may be performed independent of brand or type of power source and independent of vehicle and/or powertrain speed or torque requirements.

One embodiment of the present lifespan management and control system 100 for generating an lifespan management and control strategy is diagrammatically illustrated in FIG. 1. The lifespan management and control system or process 100 of the present disclosure comprises a first step of determining the conditions by which the lifespan management process is triggered or initiated 110. Typically, the lifespan management process is initiated based on one or multiple inputs 115 that may be from one or more power sources 320 or inputs 115 from the vehicle and/or powertrain 330 (see FIGS. 1 and 3).

These inputs 115/404 may include, but are not restricted to, battery power limit, state-of-charge (SOC) of the battery or fuel cell, coolant flow, ambient temperature, no fault operations or fault conditions, average or current power levels, voltage, current, etc. (see FIGS. 1 and 4). Inputs 115/404 may also include look ahead data and information, such as weather, road and/or sea conditions, as well as specific age, lifespan, or state-of-health parameters or metrics about the power sources. In other embodiments, the generation of the lifespan management and control strategy may include determining the power needs of a vehicle and/or powertrain or the power output of the one or more power sources based on data and/or information provided as an input 115/404.

In some embodiments, the lifespan management and control strategy may be generated and implemented based on input 115/404 distance and conditions under which the vehicle and/or powertrain must travel. In some embodiments, the lifespan management and control strategy may be generated and implemented based on input 115/404, such as the current speed, velocity, current, voltage, faults, etc. of the vehicle and/or powertrain as it travels on a route. In some embodiments, the lifespan management and control strategy may be generated and implemented based on the input 115 time required to start, shut down, initiate, charge, or refuel the one or more power sources on the vehicle and/or powertrain. In other embodiments, the lifespan management and control strategy may be generated and implemented based on one or more of these, other or system external input 115/404 factors.

Input data or inputs 115/404 are used to generate the lifespan management and control strategy comprising the state-of-health and/or the lifespan of a power source. Generation of the lifespan management and control strategy may utilize the inputs 115/404 to estimate or predict the state-of-health of the power sources. For example, in some embodiments the state-of-health of a power source is estimated or predicted based on real-time operational parameters, metrics, and data compared to "start-of-life" parameters of the power source. More specifically, internal qualitative or quantitative parameters, such as metrics, signals, sensors, data, algorithms, outputs and/or inputs of the power source (e.g., fuel cell) may be assessed or measured in real-time and further utilized to determine the estimated and/or present state-of-health (SOH).

As known in the art, the "state-of-health" of a power source, such as a fuel cell or a battery, is typically a normalized expression to convey the merit of the condition of the power source. The condition of the power source to determine SOH may be compared to ideal, unused, or normal "wear-and-tear" operational conditions, as typically indicated in manufacturer specifications. For example, state-of-health of a power source is often conveyed as a percentage, with 100% SOH reflecting that the power source is working near or in perfect condition (e.g., such as when brand new), and therefore should have the lifespan as indicated in manufacturer specifications.

However, over time and with use, particularly detrimental use that causes damage to the power source, the SOH percentage will decrease to unusable conditions, such as at or below about 50% to about 0% SOH. Such detrimental use as reflected in a poor SOH expeditiously decreases the lifespan of the power source, which is the amount of time (e.g., runtime hours) the power source takes to go from being usable to unusable. Accordingly, assessment, estimation, and/or prediction of the state-of-health of the power source in real-time and/or at the vehicle or powertrain level is a key tool to better identify and control the lifespan of the power source.

For example, a fuel cell designed by a manufacturer to have a lifespan of 12 years, should have a SOH of 50% at 6 years of use. If that fuel cell indicates, for example in real-time, a SOH of 30% at 6 years of use, then the lifespan of that fuel cell will not be an additional 6 years. Thus, the normalized SOH in real-time is directly correlated with and may be used to indicate or estimate the lifespan of the fuel cell. Importantly, the present methods and systems enable the use of the SOH of the fuel cell in the vehicle or powertrain to be mathematically manipulated in order to manage, control, and/or extend the fuel cell lifespan to its manufacturer expected lifespan.

Specifically, the real-time operational conditions of a fuel cell at a specific current and power level may be compared to the same conditions at the beginning of the life of that fuel cell to determine, estimate, and/or predict the relative lifespan of the fuel cell. Determination of the relative lifespan of a power source may also be based on comparison of real-time operational conditions of a fuel cell at specific current and power levels compared to historical trends. In this regard, the lifespan management and control strategy further comprises and considers the estimated lifespan of the power source.

Generation of the estimated lifespan for the lifespan management and control strategy may include conducting, performing, or running an online and/or offline operational power assessment procedure (see FIG. 1). Typically, during this operational process the first power source (e.g., a fuel cell) is started up to be online. The fuel cell is then powered up to be operational at a first power level in order to draw a specific voltage or current (e.g., "15 kW") from the fuel cell 120. During this online and/or offline procedure or calibration process (110-175), the fuel cell is allowed to run at steady state for a time period at the first power level followed by a next power level (e.g., about 15 kW to about 20 kW) and so on until the maximum power level is reached 130.

While any time period may be used for the operational procedure to run the power source at steady state 130, a typical time period ranges from about 2 minutes to about 20 minutes, including every time period comprised therein. In another embodiment, the time period may range from about 5 minutes to about 10 minutes, including every time period comprised therein. An exemplary time period to allow the fuel cell or power source to run at steady state is generally at, about, or no greater than about 5 minutes 130.

Referring to FIG. 1, output data is generated during the operational process (110-200). Based on the output data ascertained during steady state operation of the fuel cell, the lifespan management and control strategy is further generated by using a moving average filter or any alternate method to calculate, estimate, or determine the average fuel cell stack voltage 140. The average fuel cell stack voltage or current required for the fuel cell to power up to the desired operational power level is noted, recorded, and/or stored 150. If no other power level will be assessed 170, the information generated by the online and/or offline procedure will be stored and communicated to other components or systems as output data or "outputs."

Typically, this online and/or offline procedure for operating the power source at a sequence of different power levels (110-170) may be repeated several times over a full course of an operational runtime for that power source. As an example the online and/or offline procedure may be repeated at every 500 hours (or every 1000 hours, etc.) of operation of the fuel cell. The procedure may also be manually triggered through a service tool or other method during regular maintenance intervals as previously described above. The procedure may also be triggered at the end of line testing of a new vehicle and/or powertrain with the said power source. The first power source may be subsequently and repeatedly operated at the same time period and power level as previously described at 120, but at different time intervals over the course of the full runtime or life of the power source to generate output data or "outputs."

For example, this online-offline procedure (110-175) for operating the power source may be repeated subsequently for the same or different time period as previously described at 130. Importantly, this online-offline procedure (110-175) for operating the power source may be repeated at different power levels than that utilized in 120. For example, the first power source may be powered up to be operational at a second power level to draw a specific voltage or current (e.g., "xyz kW"). This online-offline procedure for operating the power source at a second power level may be repeated several times over a full course of operational runtime for the power source to generate "outputs" at the second power level. Further, this same online-offline procedure (110-175) as shown in FIG. 1 for operating the power source may be performed at a maximum power level ("MaxPower") and repeated subsequently over a full course of operational runtime to generate "outputs" up to and at the maximum power level.

In a typical example, this process of running the online-offline procedure (110-175) may be repeated multiple times at different power levels. For example, the online-offline procedure (110-175) may start at or about 15 kW, then be run at or about 20 kW, then run at or about 25 kW, then run at or about 30 kW, then run at or about 35 kW, etc. In this illustrative example, the online-offline procedure (110-175) may continue to be repeated at specific increments (e.g., 5 kW increments) to at or about 150 kW and/or until maximum fuel power has been reached. When all power levels are complete 160, final output data and/or "output" may be generated in order to proceed with the final process described in steps 180-200.

The output data generated by the online-offline procedure may be used to automatically and/or manually create a trend line that indicates, estimates, and/or predicts the state-of-health, age, and/or lifespan of the power source. Ideally, the online-offline procedure is repeated a number of times ranging from about 4 to about 20 times, including any specific number of repeat online-offline cycles comprised within that range. In an illustrative embodiment, the online-offline procedure is repeated at, about, or no more than about eight times at various different power levels (see FIG. 2). In particular, when the first power source of a hybrid power source is a fuel cell or fuel cell stack, the online-offline operational procedure may be repeated indefinitely as long as the conditions are favorable and doing so is supported by a second power source, such as a battery.

At the end of multiple rounds of conducting the online-offline procedure (110-170) for different time intervals and for different power levels with different power sources, the outputs of each process become additional inputs 115/404. Those inputs 115/404 may be incorporated into an algorithm comprised by a processor to generate and/or estimate the state of health of the power source. In one embodiment, the inputs 115/404 may be entered automatically or manually by a user, operator, or a controller into a processor comprising mathematical formulas or algorithms. These mathematical algorithms process and/or manipulate the quantitative or qualitative inputs 115/404, including the outputs of the online-offline procedure, to generate the estimated present state of health (SOH) of the power source. That SOH may be further utilized and mathematically manipulated by algorithms in the processor to generate a lifespan management and control strategy.

Figure 2:
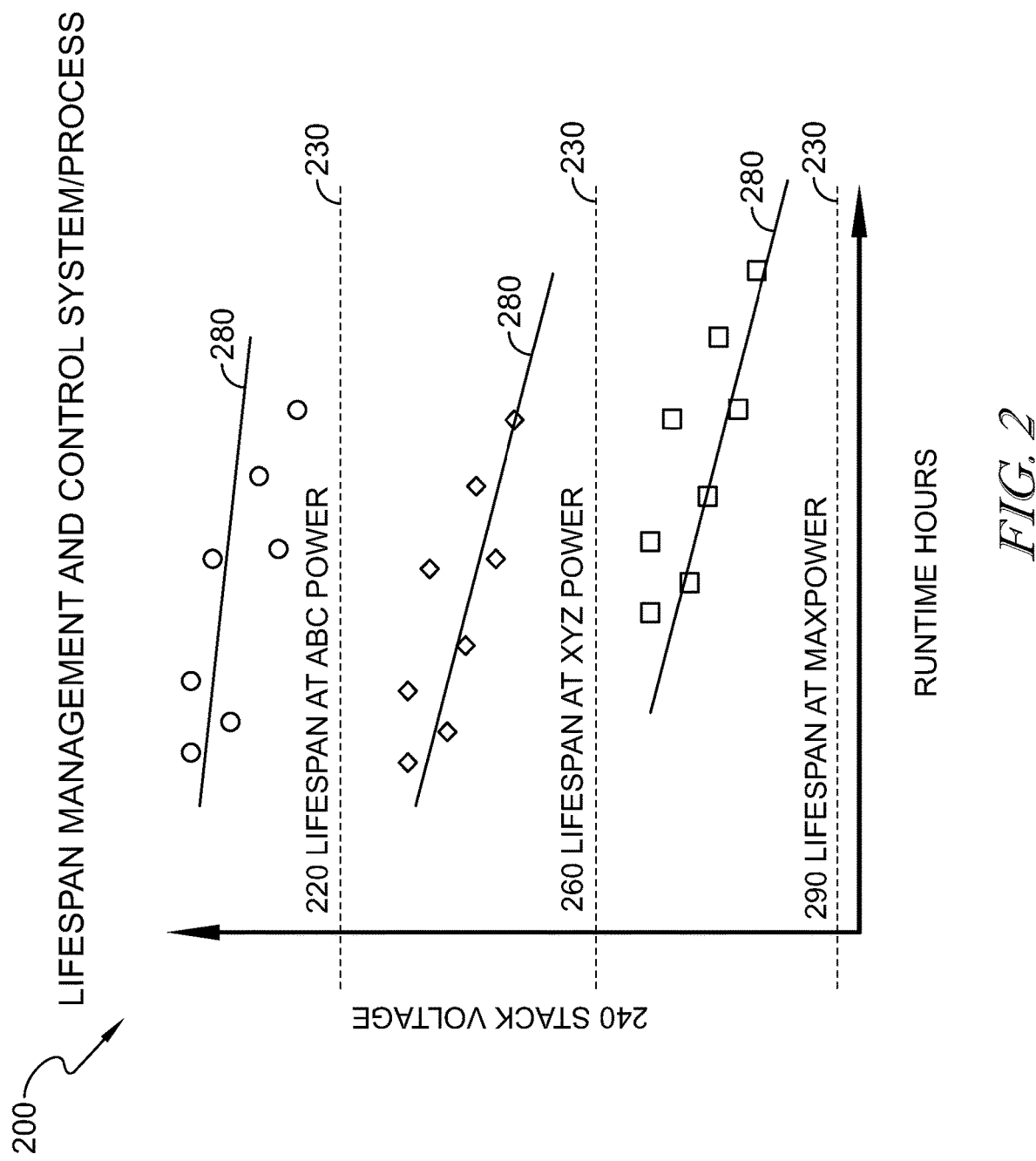
FIG. 2 is a schematic of graphed data showing the lifespan estimation trend lines of a fuel cell determined by a lifespan management and control strategy when comparing runtime (in hours) at different power levels versus average fuel cell stack voltage.

In one embodiment the state-of-health is automatically and/or algorithmically reflected by generating or creating a trend line. For example, the online-offline procedure (110-175) for operating the power source at multiple power levels (e.g., "abc kW," "xyz kW," or "MaxPower") at multiple time points and/or time periods over the full course of operational runtime may generate a trend line 180. In one embodiment, as shown in FIGS. 1 and 2, the trend line may be represented by the average fuel cell stack voltage or current output data 240 plotted on a graph along with the total runtime achieved in a time period 150. In additional embodiments, the trend line may be used to estimate or predict the state-of-health, age, and/or lifespan 190 of the power source (e.g., a fuel cell).

As seen in FIG. 2, this online-offline procedure for operating the power source at multiple power levels (e.g., "abc kW," "xyz kW," or "MaxPower") when repeated over a full course of operational runtime for the power source may be used to generate a trend line 280 to estimate or predict the state-of-health and lifespan 290 of the power source (e.g., a fuel cell) as compared to steady state 230. The estimated state-of-health of the power source at a specific power level 190/220, 190/260, 190/290 is then used functionally normalize the real-time or estimated present state-of-health of the power source 200 such that the lifespan of the power source may be estimated, preserved, maintained, and/or extended.

More specifically, the output data generated during the operational process (110-200) at each power level is shown in FIG. 2 as data points. At a time period within or at least every 500 hours or so the offline-online procedure (110-175) is run to generate a data point. Those data points are used to algorithmically generate one or more trend lines during process step 180 of FIG. 1, wherein the trend line correlates with the state-of-health of the fuel cell and is utilized to predict or estimate the lifespan of the fuel cell during step 190 of the operational process (110-200).

The slope of the trend line, the stack voltage, and the runtime may also be automatically, electronically, and/or algorithmically determined. As shown in FIG. 2, during step 200 of the operational process (110-200) to normalize the state-of-health information and determine the lifespan of a fuel cell, the slope of a trend line (K) is typically determined by calculating the height (h) of one data point on the trend line divided by the length (l) of the trend line from that data point to zero. The height (h) of the trend line represents the fuel cell stack voltage 240 and the length (l) of the trend line represents the runtime of the fuel cell in hours, such that the slope is determined as follows.

$$K = \text{height/length} = \text{volts/hour}$$

Since the runtime hours of any fuel cell as per manufacturer design is known, one may also determine the stack voltage in real time or at the end of life of a power source, wherein C is a constant. Conversely, the runtime hours at the end of life may also be determined as follows.

$$\text{Stack Voltage at End of Life} = K \times \text{Runtime Hours} + C$$

$$\text{Runtime Hours at End of Life} = (\text{Present Stack Voltage} - C)/K$$

Once the runtime hours at the end of life or the estimated lifespan remaining for the power source has been determined, that value may be utilized to determine, estimate, or normalize the state-of-health of the fuel cell. The normalized or estimated state-of-health may be determined by dividing the present, current or real-time hours of runtime by the runtime hours at the end of life. More specifically, the normalized state-of-health may be algorithmically calculated as follows, and its use is advantageous because one is not required to know what the actual or absolute state of health of the fuel cell is to estimate the lifespan of the power source.

$$1 - (\text{Runtime Hours Used Today/Runtime Hours at End of Life}) \times 100\%$$

Figure 4:
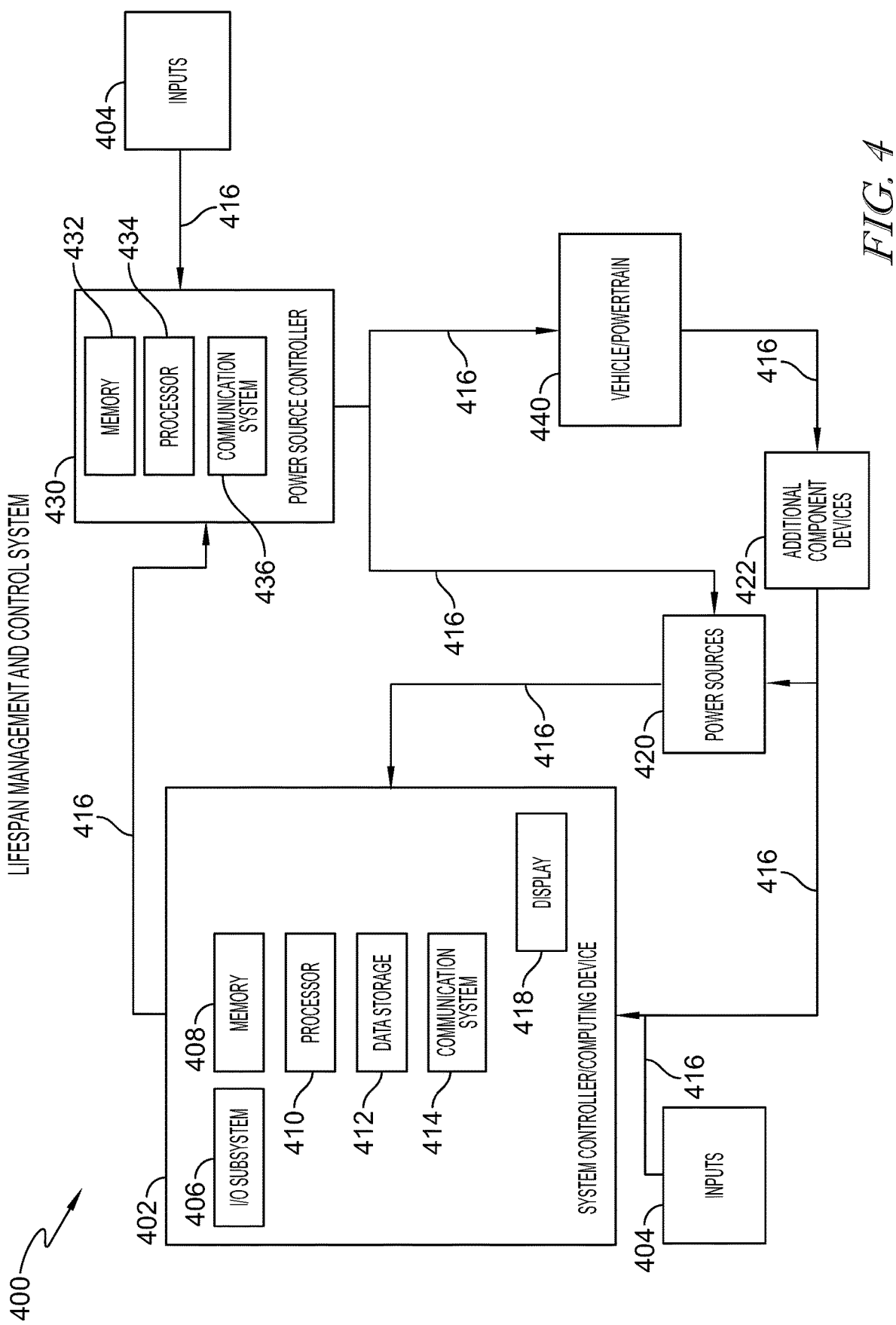
FIG. 4 is a schematic of one embodiment of a lifespan management and control system to increase lifespan of a fuel cell.

As shown in step 200 of FIG. 1, this normalized state-of-heath information may be further utilized as inputs 115/404 by processors 434 and/or controllers 402/430 comprising one or more control algorithms. Referring to FIG. 4, the normalized state-of-health may be directly communicated and/or used to generate a lifespan management and control strategy that is communicated 414/416/434 to a power source controller 430. For example, the algorithms in the power source control controller 430 or processor 434 may generate the lifespan management and control strategy based on the estimated or normalized state-of-health, the lifespan estimation, and/or additional inputs 115/404 that is communicated to the one or more fuel cell or power sources such that its age or lifespan may be preserved, maintained, and/or extended (see FIG. 4).

Additional methods to employ the lifespan management and control strategy in order to estimate or predict the real-time or estimated present state-of-health of the fuel cell or power source may include, but are not limited to use of trend line outputs, remaining age, remaining power, averaging remaining life (in hours) at each power level, determining the minimum life remaining (in hours) at each power level, and utilizing a normalized value on 0-100% scale at each power levels, or combinations thereof. Notably, each of these methods or processes to ascertain the relative or real-time or estimated present state-of-health may be implemented using vehicle and/or powertrain controls (e.g., not power source controls) to split power between multiple power sources. As an example, if the remaining life (in hours) of a fuel cell of a hybrid battery system at a certain power level is low compared to the life of the fuel cell when operated at other power levels, the vehicle and/or powertrain controller may operate the fuel cell below that specific power level so as to help improve life of the vehicle and/or powertrain system and to extend life of the fuel cell.

Additionally, the operational process (110-200 of FIG. 1) described herein for estimating and/or predicting the fuel cell life, as often depicted in in situ polarization curves, can be triggered by multiple conditions. In one embodiment, the online-offline process described herein may be initiated or triggered, such as every 500 hours of fuel cell of vehicle operation, automatically or manually, and/or when the average power falls or has been sustained below a designated threshold.

In one embodiment, the operational process described herein may be triggered or initiated using a physical or electronic service tool during regular maintenance checks or preventative maintenance, such as by service, engineering, dealership, or fleet maintenance controllers. Simply, the operational process described herein may be manually activated by an operator of a vehicle and/or powertrain, such as by pressing a specific button on the vehicle dash or console. Further, the operational process described herein may be implemented by using look ahead electronic horizon data or other environmental, logistical, and/or geographical information to identify the opportunity on route to perform the process.

Importantly, the operational process described herein does not have to be conducted in a single setting, but may instead be performed intermittently or concurrently. For example, a controller may stagger the data capture for specific power levels over several hours or days. In addition, the operational process may also be staggered to an extent that a controller operates a fuel cell at a certain power level for a time period in a steady state operating window to capture data, then reverts back to normal operation. Subsequently, the controller may target running the operational process at the next power level at the next available opportunity.

Figure 3:
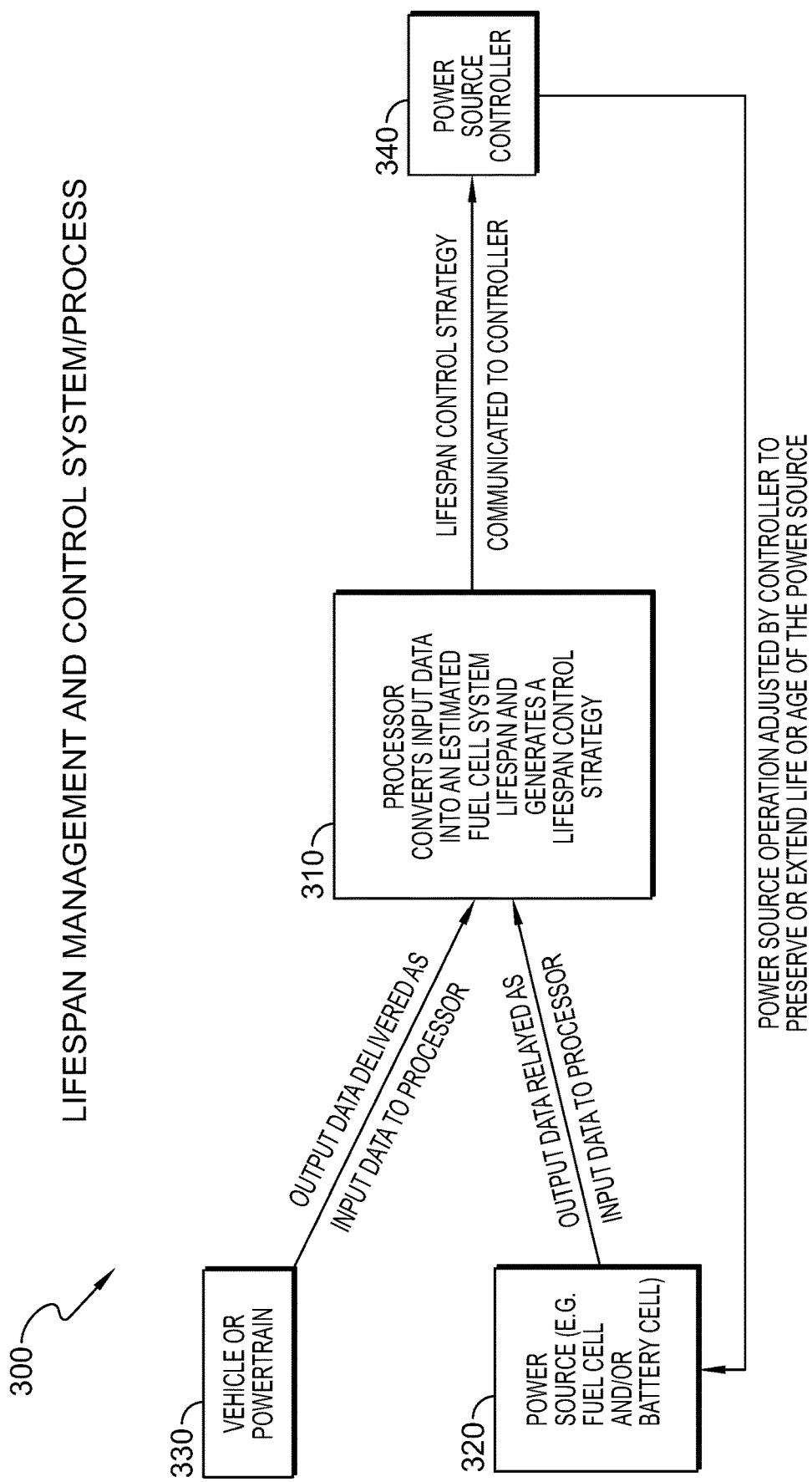
FIG. 3 is a block diagram of one embodiment of a method to generate a lifespan management and control strategy to increase lifespan of a fuel cell.

Referring to FIG. 3, the lifespan management and control strategy 300 of the present methods and systems may be applied or implemented on the power source (e.g., fuel cell and/or battery) 320 by a power source controller 340 and a power source processor 310. The power source controller 340 or operator may be located at or employed by a manufacturer, a designer, a factory, a service center, a distributor, and/or a dealer of the vehicle and/or powertrain 330 or the fuel cell module or system 320. The power source controller 340 or operator may also be located near (e.g., attached to, connected with, or within the same room or vicinity of the fuel cell) or far (e.g., outside of same room or general vicinity of the fuel cell) from the fuel cell, such that the power source controller 340 may control the fuel cell 330 from a distance or remotely.

In one embodiment, the power source controller 340 or the operator is a human. In another embodiment, the power source controller 340 or the operator is a robot or a computer. In yet another embodiment, the power source controller 340 may comprise both human intervention and automated application and/or implementation of the lifespan management and control strategy of the present methods and systems on one or more power sources or fuel cells. In a further embodiment, the power source controller 340 does not comprise human intervention at all or comprises substantially limited human intervention. Instead, the power source controller 340 may apply and/or implement the lifespan management and control strategy of the present methods and systems on one or more power sources 320 or fuel cells automatically and/or electronically.

For example, the disclosed embodiments of the present lifespan management and control strategy 300 may be implemented, in some cases, in hardware, firmware, software, or any combination thereof. The disclosed embodiments of the lifespan management and control strategy 300 may also be implemented as instructions carried by or stored on a transitory or non-transitory machine-readable (e.g., computer-readable) storage medium, which may be read and executed by one or more processors. The disclosed embodiments may be initially encoded as a set of preliminary instructions (e.g., encoded on a machine-readable storage medium) that may require preliminary processing operations by a source compute device (e.g., the device that is to send the instructions), such as one or more processors, to prepare the instructions for execution on a destination compute device (e.g., a device that receives and execute the instructions). For example, the processors may comprise control algorithms to determine the current or real-time state-of-health that may broadcast instructions and/or information on the Controller Area Network (CAN) or LIN system of a vehicle and/or powertrain system.

In one embodiment, preliminary processing of the lifespan management and control strategy may be performed. Preliminary processing of the lifespan management and control strategy may include combining the instructions with data present on a device, translating the instructions to a different format, performing compression, decompression, encryption, and/or decryption, combining multiple files that include different sections of the instructions, integrating the instructions with other code or information present on a device, such as a library or an operating system, or similar operations.

Preliminary processing may be performed by a source computing device, the destination computing device, or an intermediary computing device. A machine-readable storage medium may be embodied as any storage device, mechanism, or other physical structure for storing or transmitting information in a form readable by a machine (e.g., a volatile or non-volatile memory, a media disc, or other media device).

Referring to FIGS. 3 and 4, the present method and control system 400 further comprises a system controller or computing device 402 to facilitate the transfer of data from the one or more power source controllers 340/430 (e.g., a fuel cell controller and a battery controller) and/or other network communications as input 404. The control system 400 may include a computing device 402 in communication over a network 416 with other components of the control system 400 including but not limited to a power source controller 340/430, one or more power sources 320/420 in the vehicle and/or powertrain 330/440, and other components 422 of the vehicle and/or powertrain 330/440 that determine and/or effect function and performance.

The system controller or computing device 402 as well as the power source controller 340/430 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

In one embodiment, the system controller 402 and the power source controller 340/430 are comprised in the same device. In another embodiment, the system controller 402 and the power source controller 340/430 are separate and different controllers that are independently and directly connected to and in communication with the one or more power sources 320/420 (see FIG. 4). In another embodiment, only the power source controller 340/430 is directly connected to and in communication with the one or more power sources 320/420. In a further embodiment, each of the one or more power sources 320/420 has a power source controller 340/430 that is directly connected to and in communication with the one or more power sources 320/420.

The illustrative computing device 402 and/or the power source controller 430 of FIG. 4 may include one or more of an input/output (I/O) subsystem 406, a memory 408/432, a processor 410/434, a data storage device 412, a communication subsystem 414/436, and a display 418 that may be connected to each other, in communication with each other, and/or configured to be connected and/or in communication with each other through wired, wireless and/or power line connections and associated protocols (e.g., Ethernet, Infini-Band®, Bluetooth®, Wi-Fi®, WiMAX, 3G, 4G LTE, 5G, etc.).

The computing device 402 and/or the power source controller 430 may also include additional and/or alternative components, such as those commonly found in a computer (e.g., various input/output devices). In other embodiments, one or more of the illustrative computing device 402 and/or the power source controller 430 components may be incorporated in, or otherwise form a portion of, another component. For example, the memory 408/432, or portions thereof, may be incorporated in the processor 410/434.

The processor 410/434 may be embodied as any type of computational processing tool or equipment capable of performing the functions described herein. For example, the processor 410/434 may be embodied as a single or multi-core processor(s), digital signal processor, microcontroller, or other processor or processing/controlling circuit. The memory 408/432 may be embodied as any type of volatile or non-volatile memory or data storage capable of performing the functions described herein.

In operation, the memory 408/432 may store various data and software used during operation of the computing device 402/430 such as operating systems, applications, programs, libraries, and drivers. The memory 408/432 may be directly and communicatively coupled to the processor 410/434 or via the I/O subsystem 406, which may be embodied as circuitry and/or components to facilitate input/output operations with the processor 410/434, the memory 408/432, and other components 422 of the computing device 402/430.

For example, the I/O subsystem 406 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 408/432 may be directly coupled to the processor 410/434, for example via an integrated memory controller hub. Additionally, in some embodiments, the I/O subsystem 406 may form a portion of a system-on-a-chip (SoC) and be incorporated, along with the processor 410/434, the memory 408/432, and/or other components of the computing device 402/430, on a single integrated circuit chip (not shown).

The data storage device 412 may be embodied as any type of device or devices configured for short-term or long-term storage of data such as, for example, memory devices and circuits, memory cards, hard disk drives, solid-state drives, or other data storage devices. The computing device 402 also includes the communication subsystem 414/436, which may be embodied as any communication circuit, device, or collection thereof, capable of enabling communications between the computing device 402/430 and other remote devices over the computer network 416.

The components of the communication subsystem 414/436 may be configured to use any one or more communication technologies (e.g., wired, wireless, cloud-based, and/or power line communications) and associated protocols (e.g., Ethernet, InfiniBand®, Bluetooth®, Wi-Fi®, WiMAX, 3G, 4G LTE, 5G, etc.) to effect such communication among and between system components and devices. The power source controller 430, the power sources 420, the additional devices or components 422, the system computing device 402, and additional features or components 440 of the vehicle and/or powertrain may be connected, communicate with each other, and/or configured to be connected or in communication with each over the network 416 using one or more communication technologies (e.g., wired, wireless, cloud-based, and/or power line communications) and associated protocols (e.g., Ethernet, InfiniBand®, Bluetooth®, Wi-Fi®, WiMAX, 3G, 4G LTE, 5G, etc.).

The computing device 402 and power controller 430 may also include any number of additional input/output devices, interface devices, hardware accelerators, and/or other peripheral devices. The computing device 402 and power controller 430 of the control system 100 of a vehicle and/or powertrain 440 may be configured into separate subsystems for managing data and coordinating communications throughout the vehicle and/or powertrain.

The display 418 of the computing device 402 or the power controller 430 (not shown) may be embodied as any type of display capable of displaying digital and/or electronic information, such as a liquid crystal display (LCD), a light emitting diode (LED), a plasma display, a cathode ray tube (CRT), or other type of display device. In some embodiments, the display 418 may be coupled to or otherwise include a touch screen or other input device.

In one embodiment, an lifespan management and control strategy is generated by the processor 410/434 based on several inputs 404, and applied or implemented by a power source controller 430 to affect the functioning of the one or more power sources 420 and ultimately, the vehicle and/or powertrain 440. The inputs 404 are provided by an operator or publicly or privately available information. In one embodiment, an lifespan management and control strategy is generated by the processor 410/434 based on several inputs 404, and applied or implemented by a power source controller 430 in real time or automatically to affect the functioning of the one or more power sources 420 and the vehicle and/or powertrain 440. In one embodiment, the power source controller 430 and its respective components 432/434/436 are in the same system controller or computing device 402 as the system processor 410. In other embodiments, the power source controller 430 may include a memory 432, a processor 434, and a communication system 436, as previously described.

Generation of the lifespan management and control strategy also depends on the power sources 420 in the vehicle and/or powertrain 440 and the information about the performance, state-of-health, age, and lifespan that the processor 434 can access from each power source 420 present in the vehicle and/or powertrain 440 over the communication network 416. The power source controller 430 is capable of controlling operational functionality and/or performance of the one or more power sources 420 (e.g., fuel cell or fuel cell stack, engine, and/or battery) and other equipment and/or parts included in the vehicle and/or powertrain 440 to ultimately control, preserve, manage, or maintain the age and lifespan of the power sources 420 and/or the performance and operational functionality of the vehicle and/or powertrain 440.

The power source controller 430 may control the operational functionality and/or performance of various aspects 440 of the vehicle and/or powertrain. For example, the power source controller 430 may be configured to be connected to and/or in communication with other components 422 in the power sources 420, such as a fuel cell or battery system that may include, but are not limited to valves, pipes, lines, wires, modems, conduits, manifolds, actuators, sensors, storage tanks (e.g., water, hydrogen, air, and/or fuel storage tanks), air supply, motors, generators, and drive trains. Communication from the power source controller 430 to these other power source components 422 may alter, decrease, increase, negate, or enhance the function or performance of the one or more power sources 420.

In one embodiment, the lifespan management and control strategy is applied or implemented by a power source controller 430 present on the vehicle and/or powertrain 440. In other embodiments, the lifespan management and control strategy is applied or implemented by a power source controller 430 that is not present on the vehicle and/or powertrain 440. In other embodiments, the lifespan management and control strategy is applied or implemented by a power source controller 430 that is remotely, automatically, programmatically, systemically, or locally controlled and/or activated on the vehicle and/or powertrain 440, such as by a user or an operator. In one embodiment, the generation of the lifespan management and control strategy by the processor 434/410 and the application or implementation of the lifespan management and control strategy by the power source controller 430 may occur in real-time.

In one embodiment, the generation of the lifespan management and control strategy by the processor 434/410 includes identifying a primary power source selected from all the available power sources 420 in a vehicle and/or powertrain 440 to generate power for the vehicle and/or powertrain 440. The primary power source 420 may be a single power source or a combination of more than one power source (e.g., a hybrid power source).

In one embodiment, the power sources 420 in a vehicle and/or powertrain may include, a fuel cell or fuel cell stack, and a battery. In a further embodiment, the power sources 420 may consist essentially of a fuel cell or fuel cell stack and a battery.

In one embodiment, the generation of the lifespan management and control strategy by the processor 434/410 may include identifying the power needs of a vehicle and/or powertrain 440 based on certain inputs 404/115 as previously described. The generation of the lifespan management and control strategy by the processor 434/410 may include receiving inputs 404/115 that may enable determination of the duration of time for which power is needed and from what power source the required power will be retrieved. In one embodiment, the duration for which power is needed may be the duration that the vehicle and/or powertrain 440 is traveling. In other embodiments, the duration for which power is needed may be different.

In one embodiment, the generation of the lifespan management and control strategy by the processor 434/410 may include determining the power required for maneuvering the vehicle and/or powertrain 440 to arrive at a desired location. In other embodiments, the generation of the lifespan management and control strategy by the processor 434/410 may include determining the power required from the one or more power sources 420 to power the vehicle and/or powertrain 440 in order to arrive to a destination and return to an original location.

In one embodiment, generation of the lifespan management and control strategy by the processor 434/410 may include using a battery as the primary power source 420. Generation of the lifespan management and control strategy by the processor 434/410 may include getting inputs 404/115 that may enable determination of when to charge or utilize the battery as the power source 420 versus using the fuel cell as the power source 420 in order to maintain, preserve, and/or extend the lifespan of one or more of the power sources (e.g., the fuel cell) 420. In other embodiments, the generation of the lifespan management and control strategy by the processor 434/410 may include getting inputs 404/115 that may enable determination of how much to charge the battery to ensure the state-of-health, age, or lifespan of the fuel cell is preserved, extended, and/or maintained.

In one embodiment, generation of the lifespan management and control strategy by the processor 434/410 may include a method to determine if the power sources 420 in the vehicle and/or powertrain 440 or any of the inputs 404/115 needed to generate the lifespan management and control strategy by the processor 434/410 have been tampered with or altered. In some embodiments, vehicle to infrastructure (V2I) communication or manual action by an operator may be implemented to validate the lifespan management and control strategy and determine if tampering is detected. For example, if a battery or fuel cell utilization or charging strategy has been altered or compromised either by software or hardware tampering, validation of such tampering and correction or compensation of the appropriate lifespan management strategy of the power sources 420 may be performed automatically (e.g., by the processor and controller) or manually by an operator.

In one embodiment, validation of the lifespan management and control strategy generated by the processor 434/410 may be performed to safeguard the power sources 420 and prevent any damage to them. In some embodiments, the power sources 420, such as the fuel cells, fuel cell stack or battery, may be safeguarded against over-heating, over use, improper utilization, wear and tear, improper charging and/or improper start-up or shutdown. In other embodiments, validation may be performed to review all inputs 404/115 used to generate the lifespan management and control strategy. In some embodiments, the validation may be performed automatically (e.g., by the processor and controller) or manually by an operator.

In one embodiment, the lifespan management and control strategy generated by the processor 434/410 may be tailored by an operator based on the operating condition of the power sources 420, review of the inputs 404/115, review of any tampering, the location, region, or conditions where the vehicle and/or powertrain 440 is operating, or the time required by the vehicle and/or powertrain to travel and/or return from any destination. Tailoring refers to manipulation of the system and/or method inputs, controls, and/or performance by an operator. Typically, tailoring is warranted and utilized when specific, detailed, and/or updated information is available to an operator than what is available via inputs 404/115 of the present system or method at the time the manipulation or tailoring occurs. In some embodiments, an operator may use tailoring to aid in the preservation or extension of the state-of-health, age, and/or lifespan of a power source 420.

In one embodiment, the generation of the lifespan management and control strategy by the processor 434/410 may include getting additional inputs 404/115 associated with a fuel cell or battery state of charge (SOC). If the power sources 420 in a vehicle and/or powertrain 440 are an engine and a battery, the vehicle and/or powertrain 440 may be sensitive to the battery SOC. In other embodiments, if the battery is powered by a fuel cell or fuel cell stack, the vehicle and/or powertrain may be less sensitive to the battery SOC because the fuel cell or fuel cell stack may be able to power the battery.

In one embodiment, the generation of the lifespan management and control strategy by the processor 434/410 may include engaging only a subset of fuel cells or fuel cell stacks present on the vehicle and/or powertrain 440. In other embodiments, the vehicle and/or powertrain is powered by an engine, a fuel cell or fuel cell stack, and a battery. Generation of the lifespan management and control strategy by the processor 434/410 may include utilizing different power sources 420. The lifespan management and control strategy generated by the processor 434/410 and implemented by the controller 430/402 to communicate to one or more of the power sources 420 may result in vehicle and/or powertrain using one or more power sources 420 as the primary power source.

For example, the lifespan management and control strategy 100 generated by the processor 434/410 and implemented by the controller 430/402 to communicate to one or more of the power sources 420 may result in a switch in power sources. More specifically, the vehicle and/or powertrain may switch power sources 420 from using the fuel cell or fuel cell stack as the primary power source 420 to using a battery as the primary power source 420 when the vehicle and/or powertrain 440 receives instructions from the controller that a switch of power sources 420 is necessary and/or recommended to preserve, maintain, and/or extend the life of one or all of the power sources 420.

The lifespan management and control strategy 100 generated by the processor 434/410 and implemented by the controller 430/402 to communicate to one or more of the power sources 420 may result in using a fuel cell or fuel cell stack as the primary power source for one portion of a trip or route and the battery as the primary power source in another portion of the trip or route. One or more lifespan management and control strategies may be generated by the processor 434/410 and implemented by the controller 430/402 to independently communicate to each specific power source 420, such as each primary power source 420.

For example, a first lifespan management and control strategy 100 may be generated by the processor 434/410 and implemented by the controller 430/402 to selectively control a first primary power source (e.g., a fuel cell or fuel cell stack) 420 of a vehicle and/or powertrain 440. Similarly, a second lifespan management and control strategy may be generated by the processor 434/410 and implemented by the controller 430/402 to selectively control a second primary power source (e.g., a battery) 420 of the vehicle and/or powertrain 440. Additional lifespan management and control strategies may be generated by the processor 434/410 and implemented by the controller 430/402 to selectively control additional primary power sources 420 located within the vehicle and/or powertrain 440.

Accordingly, the present vehicle and/or powertrain 440 may include a method and system that utilizes a first lifespan management and control strategy that may be generated by the processor 434/410 and implemented by the controller 430/402 to independently communicate to a first primary power source 420 and a second lifespan management and control strategy that may be generated by the processor 434/410 and implemented by the controller 430/402 to independently communicate to a second primary power source 420.

The method further comprises selectively controlling the first primary power source 420 with the first lifespan management and control strategy and selectively controlling the second primary power source 420 with the second lifespan management and control strategy. In some embodiments, the one or more lifespan management and control strategies may implement selective utilization of the more than one fuel cell stacks. In addition to selectively utilizing a first primary power source 420 and/or a second primary power source 420, selective utilization of the one or more power sources of the present method and system, such as the first primary power source 420 and/or the second primary power source 420 may include utilizing only a portion of the primary power source 420 versus the full primary power source 420. In one embodiment, the vehicle and/or powertrain 440 may comprise a primary power source 420 that comprises one or more multiple power sources 420. For example, a vehicle or powertrain may have a primary power source that comprises multiple, duplicative power sources, such as multiple fuel cell stacks, multiple batteries, or combinations thereof.

In an illustrative embodiment, a primary power source 420 of the present vehicle and/or powertrain 440 may be a fuel cell stack. The fuel cell stack may comprise one or more, multiple, and/or a plurality of fuel cells. As is known in the art, the plurality of fuel cells may be configured to be connected and/or stacked in series in order for the fuel cell stack to generate the required power to operate the vehicle and/or powertrain 440.

During selective utilization of a primary power source, such as a first fuel cell stack, the lifespan management and control strategy of the present method or system may be generated by the processor 434/410 and implemented by the controller 430/402 to operate only a portion of the fuel cell stack in order to reduce and/or prevent the aging and/or deterioration of the fuel cell stack. Preferably, the fuel cell stack is operated in a strategic manner in order to maintain, preserve, and or extend the life or age of the fuel cell stack based on determination of its current or real-time state-of-health as described herein.

In a illustrative embodiment, selective utilization of a fuel cell stack comprising multiple fuel cells may include limiting, reducing, and/or regulating the number of fuel cells that are operational. For example, a fuel cell stack comprising 12 fuel cells, may operate only a portion of the fuel cell stack, such as any subset or number of fuel cells (e.g., only 10 fuel cells, 6 fuel cells, or 4 fuel cells) that provide the necessary power operate the vehicle and/or powertrain at an acceptable level.

In an additional embodiment, selective utilization of a fuel cell stack comprising multiple fuel cells may include limiting, reducing, and/or regulating the power capacity provided by any proportion of fuel cells of total fuel cell stack that is operational. For example, a fuel cell stack comprising any number of fuel cells operating at 100% capacity, may be selectively utilized to operate at any capacity ranging from 0% to about 100%, including any specific operational capacity percentage comprised therein.

Inputs 404/115 to the processor 434/410 from, for example, one or more sensors (e.g., hydrogen sensors) on the vehicle and/or powertrain 440, may determine that the state-of-health of one or more power sources 420 is suboptimal. Instructions established by the processor 434/410 may then be communicated to the controller 430/402 and to further additional vehicle components (e.g., exhaust, tank, etc.) 422 to implement or utilize a different power source 420 to provide a portion or all of the power to the vehicle and/or powertrain 420.

Alternatively, the controller may instruct the power source 420 to change, reduce, and/or shutdown the operational level of the suboptimal power source 420, and/or start up or increase the power provided by a separate or different power source 420. More specifically, in one embodiment, the application or implementation of the lifespan management and control strategy by the controller 430/402 may include altering, decreasing, increasing, negating, restricting, or enhancing the functionality of the power sources 120 used in or when the vehicle and/or powertrain 420, especially those power sources 420 that are not identified as the primary power source 420 or are identified to not be the primary power source 420. In other embodiments, the application or implementation of the lifespan management and control strategy by the controller 430/402 includes controlling, changing, restricting, and/or managing the functionality or power output of the one or more power sources 420.

In one embodiment, readiness, application, and/or implementation of the lifespan management and control strategy by the controller 430/402 includes preparing for, accounting for, and/or managing the time required for a start-up sequence or shutdown sequence of the one or more power sources 420 in the vehicle and/or powertrain 440. In some embodiments, readiness to implement the present lifespan management and control strategy by the controller 430 includes preparing for, accounting for, and/or managing the time required for a start-up sequence or shutdown sequence of a fuel cell, fuel cell stack, and/or a battery.

In a specific embodiment, readiness to implement the present lifespan management and control strategy in a vehicle and/or powertrain comprising a fuel cell or fuel cell stack and a battery as the primary power sources 420 includes incorporating time to allow for a start-up and/or shutdown sequence of a fuel cell or fuel cell stack, as well time for sufficient charging of a battery (e.g., by the fuel cell or fuel cell stack). Incorporation of such timing into the present lifespan management and control strategy not only ensures successful and compliant travel of the vehicle and/or powertrain 440, but also ensure that minimal to no damage is incurred by either power source (e.g., the fuel cell or fuel cell stack and the battery) 420. Insufficient timing to allow for each primary power source to successfully ramp up or down will result in damage to one or both primary power sources, and thus increase the aging and reduce the state-of-health and lifespan of the power source 420.

For example, a typical fuel cell stack may require about 30 seconds to about 30 minutes to start-up or shutdown. In some embodiments, a hydrogen fuel cell stack, such as comprising one or more proton exchange membrane fuel cells also called a polymer exchange membrane fuel cells (PEMFC), may have variable start-up times. In one embodiment the start-up time for a hydrogen fuel cell stack in non-freezing conditions may range from about 30 seconds to about 5 minutes, including any specific time comprised therein, such as from about 30 seconds to about 2 minutes. In another embodiment the start-up time for a hydrogen fuel cell stack in freezing conditions may range from about 30 seconds to about 15 minutes, including any specific time comprised therein, such as from about 30 seconds to about 10 minutes.

In some embodiments, a hydrogen fuel cell stack, such as one comprising one or more PEMFCs, may have variable shutdown times. In one embodiment the shutdown time for a hydrogen fuel cell stack in non-freezing conditions may range from about 30 seconds to about 5 minutes, including any specific time comprised therein, such as from about 1 minute to about 2 minutes. In another embodiment the start-up time for a hydrogen fuel cell stack in freezing conditions may range from about 30 seconds to about 15 minutes, including any specific time comprised therein, such as from about 30 seconds to about 10 minutes.

In one embodiment, the processor 434/410, the controller 430/402, and the power sources 420 are part of a feedback loop. In one such embodiment, the processor 434/410 generates the lifespan management and control strategy based on inputs 404 from the power sources 420, along with additional inputs 404 from any other source, and the controller 430/402 implements the generated strategy by altering, decreasing, increasing, negating, or enhancing the function of other components 422, which may be linked to the function and performance of the one or more power sources 420.

Implementation of the present methods and/or the lifespan management and control system 400 comprising the lifespan management and control strategy 100/200/300 by conducting operational performance tests on the one or more power sources 420 of the vehicle and/or powertrain 440 infrastructure can estimate and/or predict the current or real-time state-of-health, age, and/or lifespan of the one or more power sources. This information may be further implemented into the power sources 420 by the control system to effectuate the utility, facilitation, preservation, and/or maintenance of the estimated present state-of-health of the power generation components (e.g., a fuel cell and/or a battery) in order to meet or exceed the power needs, operational performance, and/or lifespan of those power sources, and ultimately improve the overall performance and functionality of the vehicle and/or powertrain 440.

The following numbered embodiments are contemplated an non-limiting:

1. A method of controlling the lifespan of a fuel cell, the method comprising: i) receiving one or more inputs into a processor, ii) generating a lifespan management and control strategy by the processor, iii) communicating the lifespan management and control strategy by the processor to a power source controller, iv) controlling power output of one or more power sources by the power source controller, wherein the one or more power sources are selected from a fuel cell, a battery, and a combination thereof.

2. The method of clause 1, any other suitable clauses, or any combination of suitable clauses, wherein the method enables the use of a state-of-health of the fuel cell to be mathematically manipulated in order to manage, control, and/or extend a lifespan of the fuel cell to its manufacturer expected lifespan.

3. The method of clause 2, any other suitable clauses, or any combination of suitable clauses, wherein the state-of-health is estimated or predicted based on real-time operational parameters, metrics, signals, sensors, data, algorithms, outputs, inputs and/or data compared to "start-of-life" parameters of the fuel cell and/or the one or more power sources.

4. The method of clause 2, any other suitable clauses, or any combination of suitable clauses, wherein the state-of-health is automatically and/or algorithmically reflected by generating or creating a trend line.

5. The method of clause 4, any other suitable clauses, or any combination of suitable clauses, wherein the trend line is represented by the average fuel cell stack voltage or current output data plotted on a graph along with the total runtime achieved in a time period.

6. The method of clause 4, any other suitable clauses, or any combination of suitable clauses, wherein the trend line is used to estimate or predict the state-of-health, age, and/or lifespan of the fuel cell and/or the one or more power sources.

7. The method of clause 1, any other suitable clauses, or any combination of suitable clauses, wherein the method comprises a system controller or computing device to facilitate the transfer of data from the one or more power source controllers and/or other network communications as input.

8. The method of clause 7, any other suitable clauses, or any combination of suitable clauses, wherein the system controller or computing device is in communication over a network with other components of the control system, the power source controller, the one or more power sources in the vehicle and/or powertrain, and/or other components of the vehicle and/or powertrain that determine and/or effect function and performance.

9. The method of clause 7, any other suitable clauses, or any combination of suitable clauses, wherein the system controller or computing device is a stand-alone server, a rack-mounted server, a blade server, or another server, a physical network appliance, a virtual network appliance, a high-performance computing device, a web appliance, a distributed computing system, a computer, a processor-based system, a multiprocessor system, a smartphone, a tablet computer, a laptop computer, a notebook computer, a mobile computing device, or any type of computation or computer device capable of performing the functions described herein.

10. The method of clause 7, any other suitable clauses, or any combination of suitable clauses, wherein the system controller and the power source controller are comprised in the same device or are separate and different controllers that are independently and directly connected to and in communication with the one or more power sources.

11. The method of clause 7, any other suitable clauses, or any combination of suitable clauses, wherein the system controller or computing device includes one or more of an input/output subsystem, a memory, a processor, a data storage device, a communication subsystem, and a display that may be connected to each other, in communication with each other, and/or configured to be connected and/or in communication with each other through wired, wireless and/or power line connections and associated protocols, or through Ethernet, InfiniBand®, Bluetooth®, Wi-Fi®, WiMAX, 3G, 4G LTE, or 5G.
12. The method of clause 11, any other suitable clauses, or any combination of suitable clauses, wherein the memory is incorporated in the processor.
13. The method of clause 11, any other suitable clauses, or any combination of suitable clauses, wherein the processor is a single or multi-core processor(s), digital signal processor, microcontroller, or other processor or processing/controlling circuit, or any type of computational processing tool or equipment capable of performing the functions described herein.
14. The method of clause 11, any other suitable clauses, or any combination of suitable clauses, wherein the memory is any type of volatile or non-volatile memory or data storage capable of performing the functions described herein.
15. The method of clause 11, any other suitable clauses, or any combination of suitable clauses, wherein the memory stores operating systems, applications, programs, libraries, drivers, or various data and software used during operation of the system controller.
16. The method of clause 11, any other suitable clauses, or any combination of suitable clauses, wherein the memory is directly and communicatively coupled to the processor and/or via an integrated memory controller hub and/or via the input/output subsystem.
17. The method of clause 11, any other suitable clauses, or any combination of suitable clauses, wherein the input/output subsystem is or otherwise includes memory controller hubs, input/output control hubs, sensor hubs, host controllers, firmware devices, communication links, point-to-point links, bus links, wires, cables, light guides, printed circuit board traces, and/or other circuitry and/or components and subsystems to facilitate the input/output operations.
18. The method of clause 11, any other suitable clauses, or any combination of suitable clauses, wherein the input/output subsystem forms a portion of a system-on-a-chip.
19. The method of clause 11, any other suitable clauses, or any combination of suitable clauses, wherein the input/output subsystem, the processor, the memory, and/or other components of the system controller are incorporated on a single integrated circuit chip.
20. The method of clause 11, any other suitable clauses, or any combination of suitable clauses, wherein the data storage device is a memory device and circuit, a memory card, a hard disk drive, a solid-state drive, or any type of device or devices configured for short-term or long-term storage of data.
21. The method of clause 11, any other suitable clauses, or any combination of suitable clauses, wherein the communication subsystem is any communication circuit, device, or collection capable of enabling communications between the system controller and other remote devices over the computer network.
22. The method of clause 11, any other suitable clauses, or any combination of suitable clauses, wherein the communication subsystem is configured to use any one or more communication technologies, wired, wireless, cloud-based, and/or power line communications, and Ethernet, InfiniBand®, Bluetooth®, Wi-Fi®, WiMAX, 3G, 4G LTE, 5G, or other associated protocols.
23. The method of clause 11, any other suitable clauses, or any combination of suitable clauses, wherein the display is a liquid crystal display, a light emitting diode, a plasma display, a cathod ray tube, or any type of display device capable of displaying digital and/or electronic information.
24. The method of clause 11, any other suitable clauses, or any combination of suitable clauses, wherein the display is coupled to or otherwise includes a touch screen or other input device.
25. The method of clause 7, any other suitable clauses, or any combination of suitable clauses, wherein the system controller or computing device includes any number of additional input/output devices, interface devices, hardware accelerators, other peripheral devices, and/or additional and/or alternative components commonly found in a computer or various input/output devices.
26. The method of clause 7, any other suitable clauses, or any combination of suitable clauses, wherein the system controller and the power source controller are configured into separate subsystems for managing data and coordinating communications throught the vehicle and/or powertrain.
27. The method of clause 7, any other suitable clauses, or any combination of suitable clauses, wherein one or more of the components of the system controller are incorproated in, or otherwise form a portion of, another component.
28. The method of clause 7, any other suitable clauses, or any combination of suitable clauses, wherein the system controller, the power source controller, the one or more power sources, additional devices or components, and/or additional features or components of the vehicle and/or powertrain are connected, communicate with each other, and/or configured to be connected or in communication over the network using one or more communication technologies, wired, wireless, cloud-based, and/or power line communications, and Ethernet, InfiniBand®, Bluetooth®, Wi-Fi®, WiMAX, 3G, 4G LTE, 5G, or other associated protocols.
29. The method of clause 1, any other suitable clauses, or any combination of suitable clauses, wherein the method comprises selectively controlling a first primary power source with a first lifespan management and control strategy and selectively controlling a second primary power source with a second lifespan management and control strategy.
30. The method of clause 29, any other suitable clauses, or any combination of suitable clauses, wherein the one or more lifespan management and control strategies implement selective utilization of one or more power sources.
31. The method of clause 30, any other suitable clauses, or any combination of suitable clauses, wherein selective utilization of the one or more power sources includes utilizing only a portion of the primary power source versus the full primary power source.
32. The method of clause 30, any other suitable clauses, or any combination of suitable clauses, wherein selective utilization of the one or more power sources includes limiting, reducing, and/or regulating the power caapcity provided by any proportion of fuel cells of the total fuel cell stack that is operation.
33. The method of clause 30, any other suitable clauses, or any combination of suitable clauses, wherein selective utilization of the one or more power sources includes operating the one or more power sources at any capacity ranging from about 0% to about 100%, or any specific operational capacity percentage comprised therein.

34. The method of clause 1, any other suitable clauses, or any combination of suitable clauses, wherein the method comprises conducting operational performance tests on the one or more power sources.

35. The method of clause 34, any other suitable clauses, or any combination of suitable clauses, wherein conducting operational performance tests on the one or more power sources estimates and/or predicts the current or real-time state-of-health, age, and/or lifespan of the one or more power sources.

36. The method of clause 35, any other suitable clauses, or any combination of suitable clauses, wherein the information collected from conducting operational performance tests is implemented into the one or more power sources to effectuate the utility, facilitation, preservation, and/or maintenance of the estimated present state-of-health of the one or more power sources.

37. The method of clause 1, any other suitable clauses, or any combination of suitable clauses, wherein the fuel cell is a solid oxide fuel cell, a proton exchange membrane fuel cell, a phsophoric acid fuel cell, or a molten carbonate fuel cell.

38. The method of clause 1, any other suitable clauses, or any combination of suitable clauses, wherein the fuel cell is in a vehicle and/or powertrain.

39. The method of clause 38, any other suitable clauses, or any combination of suitable clauses, wherein the vehicle and/or powertrain is a a vessel, a marine vehicle or vessel, a train, a locomotive, a bus, a trolley, a mining equipment, an automobile, an equipment or a device used on rail, used on the waterways, used on-highways, used off-highways, used in high altitude regions, or used underground, or a plane, a helicopter, a drone, a hot hair balloon, or other aircrafts or aerial crafts.

40. The method of clause 38, any other suitable clauses, or any combination of suitable clauses, wherein the vehicle and/or powertrain is powered by one or more fuel cells accompanied by one or more high voltage patteries, ultra capacitors, or any type of power source or sink.

41. The method of clause 38, any other suitable clauses, or any combination of suitable clauses, wherein the vehicle and/or powertrain is powered by an engine, the fuel cell or fuel cell stack, and the battery.

42. The method of clause 38, any other suitable clauses, or any combination of suitable clauses, the vehicle and/or powertrain may comprise a primary power source that comprises multiple, duplicative power sources, multiple fuel cell stacks, multiple batteries, or combinations thereof.

43. The method of clause 1, any other suitable clauses, or any combination of suitable clauses, wherein the fuel cell includes one or more, multiple, and/or a plurality of fuel cells, fuel cell stacks, and/or fuel cell modules in a system.

44. The method of clause 1, any other suitable clauses, or any combination of suitable clauses, wherein the one or more inputs are from the fuel cell or the one or more power sources and/or the vehicle and/or powertrain.

45. The method of clause 1, any other suitable clauses, or any combination of suitable clauses, wherein the one or more inputs include battery power limit, state-of-charge of the battery or the fuel cell, coolant flow, ambient temperature, no fault operations or fault conditions, average or current power levels, voltage, current, look ahead data and information, weather, road and/or sea conditions, or specific age, lifespan, or state-of-health parameters or metrics about the fuel cell and/or the one or more power sources.

46. The method of clause 1, any other suitable clauses, or any combination of suitable clauses, wherein the one or more inputs are used to generate the lifespan management and control strategy.

47. The method of clause 1, any other suitable clauses, or any combination of suitable clauses, wherein the one or more inputs are collected from one or more sensors or hydrogen sensors on the vehicle and/or powertrain.

48. The method of clause 1, any other suitable clauses, or any combination of suitable clauses, wherein the one or more inputs are collected from one or more sensors or hydrogen sensors on the vehicle and/or powertrain to determine that the state-of-health of the one or more power sources is suboptimal.

49. The method of clause 48, any other suitable clauses, or any combination of suitable clauses, wherein when the state-of-health of the one or more power sources is suboptimal, instructions established by the processor are communicated to the controller and to an exhaust, a tank, or additional vehicle components to implement or utilize a different power source, or to change, reduce, and/or shutdown the operational level of the suboptimal power source, and/or start up or increase the power provided by a separate or different power source.

50. The method of clause 1, any other suitable clauses, or any combination of suitable clauses, wherein the processor is the system controller processor, the power source controller processor, or both.

51. The method of clause 1, any other suitable clauses, or any combination of suitable clauses, wherein the processor receives the one or more inputs, uses the one or more inputs to generate the lifespan management and control strategy, and communicates the lifespan management and control strategy to the power source controller.

52. The method of clause 1, any other suitable clauses, or any combination of suitable clauses, wherein the processor, the controller, and the one or more power sources are part of a feedback loop.

53. The method of clause 1, any other suitable clauses, or any combination of suitable clauses, wherein the lifespan management and control strategy comprises the one or more inputs, the estimated present state-of-health and the estimated lifespan of the fuel cell and/or the one or more power sources.

54. The method of clause 1, any other suitable clauses, or any combination of suitable clauses, wherein the lifespan management and control strategy comprises and considers the estimated lifespan of the fuel cell and/or the one or more power sources.

55. The method of clause 1, any other suitable clauses, or any combination of suitable clauses, wherein the lifespan management and control strategy is employed by the use of trend line outputs, remaining age, remaining power, averaging remaining life (in hours) at each power level, determining the minimum life remaining (in hours) at each power level, and utilizing a normalized value on 0-100% scale at each power levels, or combinations thereof.

56. The method of clause 1, any other suitable clauses, or any combination of suitable clauses, wherein the lifespan management and control strategy is implemented using vehicle and/or powertrain controls.

57. The method of clause 1, any other suitable clauses, or any combination of suitable clauses, wherein the lifespan management and control strategy is applied or implemented on the fuel source, the battery, and/or the one or more power sources by the power source controller and a power source processor.
58. The method of clause 1, any other suitable clauses, or any combination of suitable clauses, wherein the lifespan management and control strategy is applied or implemented in hardware, firmware, software, or any combination, or as instructions carried by or stored on a transitory or non-transitory machine-readable storage medium and/or a transitory or non-transitory computer-readable storage medium.
59. The method of clause 58, any other suitable clauses, or any combination of suitable clauses, wherein the transitory or non-transitory machine-readable storage medium and/or the transitory or non-transitory computer-readable storage medium is read and executed by one or more processors.
60. The method of clause 58, any other suitable clauses, or any combination of suitable clauses, wherein the transitory or non-transitory machine-readable storage medium and/or the transitory or non-transitory computer-readable storage medium is any storage device, mechanism, or other physical structure for storing or transmitting information in a form readable by a machine, a computer, a volatile or non-volatile memory, a media disc, or other media device.
61. The method of clause 1, any other suitable clauses, or any combination of suitable clauses, wherein the lifespan management and control strategy is encoded as a set of preliminary instructions and/or encoded on a machine-readable or computer-readable storage medium that requires preliminary processing operations by a source compute device.
62. The method of clause 61, any other suitable clauses, or any combination of suitable clauses, wherein the source compute device is one or more processors.
63. The method of clause 62, any other suitable clauses, or any combination of suitable clauses, wherein the one or more processors comprise control algorithms to determine the current or real-time state-of-health that broadcast instructions and/or information on the Controller Area Network or LIN system of the vehicle and/or powertrain system.
64. The method of clause 61, any other suitable clauses, or any combination of suitable clauses, wherein the source compute device prepares the instructions for execution on a destination compute device.
65. The method of clause 1, any other suitable clauses, or any combination of suitable clauses, wherein the lifespan management and control strategy is generated by the processor based on several inputs and applied or implemented by the power source controller to affect the functioning of the one or more power sources and the vehicle and/or powertrain.
66. The method of clause 65, any other suitable clauses, or any combination of suitable clauses, wherein the inputs are provided by an operator or publicly or privately available information.
67. The method of clause 65, any other suitable clauses, or any combination of suitable clauses, wherein the implementation by the power source controller is in real time or automatically.
68. The method of clause 1, any other suitable clauses, or any combination of suitable clauses, wherein the lifespan management and control strategy is tailored by an operator based on the operating condition of the one or more power sources, review of the inputs, review of any tampering, the location, region, or conditions where the vehicle and/or powertrain is operating, and/or the time required by the vehicle and/or powertrain to travel and/or return from any destination.
69. The method of clause 68, any other suitable clauses, or any combination of suitable clauses, wherein the tailoring of the lifespan management and control strategy is manipulation of the system and/or method inputs, controls, and/or performance by an operator.
70. The method of clause 68, any other suitable clauses, or any combination of suitable clauses, wherein the tailoring of the lifespan management and control strategy is warranted and utilized when specific, detailed, and/or updated information is available to an operator.
71. The method of clause 68, any other suitable clauses, or any combination of suitable clauses, wherein the tailoring of the lifespan management and control strategy is used to aid in the preservation or extension of the state-of-health, age, and/or lifespan of the one or more power sources.
72. The method of clause 1, any other suitable clauses, or any combination of suitable clauses, wherein the lifespan management and control strategy results in the vehicle and/or powertrain using one or more power sources as a primary power source.
73. The method of clause 1, any other suitable clauses, or any combination of suitable clauses, wherein the lifespan management and control strategy results in a switch in power sources.
74. The method of clause 73, any other suitable clauses, or any combination of suitable clauses, wherein the switch in power sources may be from using the fuel cell or fuel cell stack as the primary power source to using the battery as the primary power source when the vehicle and/or powertrain receives instructions from the controller that a switch of power sources is necessary and/or recommended to preserve, maintain, and/or extend the life of one or all of the power sources.
75. The method of clause 1, any other suitable clauses, or any combination of suitable clauses, wherein the lifespan management and control strategy results in using the fuel cell or fuel cell stack as the primary power source for one portion of a trip or route and the battery as the primary power source in another portion of the trip or route.
76. The method of clause 1, any other suitable clauses, or any combination of suitable clauses, wherein the lifespan management and control strategy includes one or more lifespan management and control strategies.
77. The method of clause 76, any other suitable clauses, or any combination of suitable clauses, wherein the one or more lifespan management and control strategies independently communicate to each of the one or more power sources or each primary power sources.
78. The method of clause 76, any other suitable clauses, or any combination of suitable clauses, wherein a first lifespan management and control strategy is generated and implemented to selectively control a first primary power source or the fuel cell or fuel cell stack and/or a second lifespan management and control strategy is generated and implemented to selectively control a second primary power source or the battery.
79. The method of clause 78, any other suitable clauses, or any combination of suitable clauses, wherein additional lifespan management and control strategies are generated and implemented to selectively control additional primary power sources.

80. The method of clause 1, any other suitable clauses, or any combination of suitable clauses, wherein the lifespan management and control strategy alters, decreases, increases, negates, or enhances the functionality of the one or more power sources, or the one or more power sources not identified as the primary power source or are identified not to be the primary pour source.

81. The method of clause 1, any other suitable clauses, or any combination of suitable clauses, wherein the readiness, application, and/or implementation of the lifespan management and control strategy includes preparing for, accounting for, and/or managing the time required for a start-up sequence, shutdown sequence, and/or sufficient charging of the one or more power sources, the fuel cell, fuel cell stack, and/or the battery in the vehicle and/or powertrain.

82. The method of clause 81, any other suitable clauses, or any combination of suitable clauses, wherein the start-up sequence or shutdown sequence requires about 30 seconds to about 30 minutes, from about 30 seconds to about 5 minutes in non-freezing conditions, from about 30 seconds to about 2 minutes in non-freezing conditions, from about 1 minute to about 2 minutes in non-freezing conditions, from about 30 seconds to about 15 minutes in freezing conditions, from about 30 seconds to about 10 minutes in freezing conditions, any specific time or variable times or ranges within the above ranges.

83. The method of clause 1, any other suitable clauses, or any combination of suitable clauses, wherein the power source controller controls power output for the fuel cell and/or the one or more power sources based on the lifespan management and control strategy.

84. The method of clause 1, any other suitable clauses, or any combination of suitable clauses, wherein the power source controller or processor has algorithms which generate the lifespan management and control strategy based on the estimated or normalized state-of-health, the lifespan estimation, and/or additional inputs that is communicated to the fuel cell and/or the one or more power sources such that its age or lifespan may be preserved, maintained, and/or extended.

85. The method of clause 1, any other suitable clauses, or any combination of suitable clauses, wherein the power source controller or operator is located at or employed by a manufacturer, a designer, a factory, a service center, a distributor, and/or a dealer of the vehicle and/or powertrain and/or the fuel cell module or system, and/or located near, attached to, connected with, within the same room, within vicinity of the fuel cell, and/or located far from and/or outside of the same room or general vicinity of the fuel cell.

86. The method of clause 1, any other suitable clauses, or any combination of suitable clauses, wherein the power source controller is present on the vehicle and/or powertrain, not present on the vehicle and/or powertrain, remotely, automatically, programmatically, systemically, or locally controlled and/or activated on the vehicle and/or powertrain, or remotely, automatically, programmatically, systemically, or locally controlled and/or activated on the vehicle and/or powertrain by a user or an operator.

87. The method of clause 1, any other suitable clauses, or any combination of suitable clauses, wherein the power source controller can control the fuel cell and/or the one or more power sources from a distance or remotely.

88. The method of clause 1, any other suitable clauses, or any combination of suitable clauses, wherein the power source controller or operator is a human, a robot, a computer, comprises both human intervention and automated application and/or implementation of the lifespan management and control strategy, does not comprise human intervention at all or comprises substantially limited human intervention, and/or applies and/or implements the lifespan management and control strategy on the fuel cell and/or the one or more power sources automatically and/or electronically.

89. The method of clause 1, any other suitable clauses, or any combination of suitable clauses, wherein the power source controller is a stand-alone server, a rack-mounted server, a blade server, or another server, a physical network appliance, a virtual network appliance, a high-performance computing device, a web appliance, a distributed computing system, a computer, a processor-based system, a multiprocessor system, a smartphone, a tablet computer, a laptop computer, a notebook computer, a mobile computing device, or any type of computation or computer device capable of performing the functions described herein.

90. The method of clause 1, any other suitable clauses, or any combination of suitable clauses, wherein only the power source controller is directly connected to and in communication with the one or more power sources.

91. The method of clause 1, any other suitable clauses, or any combination of suitable clauses, wherein the power source controller and its respective compones are in the same system controller or computing device as the system processor.

92. The method of clause 1, any other suitable clauses, or any combination of suitable clauses, wherein the power source controller includes one or more of an input/output (I/O) subsystem, a memory, a processor, a data storage device, a communication subsystem, and/or a display that may be connected to each other, in communication with each other, and/or configured to be connected and/or in communication with each other through wired, wireless and/or power line connections and associated protocols, or through Ethernet, InfiniBand®, Bluetooth®, Wi-Fi®, WiMAX, 3G, 4G LTE, or 5G.

93. The method of clause 92, any other suitable clauses, or any combination of suitable clauses, wherein the input/output subsystem, the processor, the memory, and/or other components of the power source controller are incorporated on a single integrated circuit chip.

94. The method of clause 92, any other suitable clauses, or any combination of suitable clauses, wherein the communication subsystem is any communication circuit, device, or collection capable of enabling communications between the power source controller and other remote devices over the computer network.

95. The method of clause 1, any other suitable clauses, or any combination of suitable clauses, wherein the power source controller or computing device includes any number of additional input/output devices, interface devices, hardware accelerators, other peripheral devices, and/or additional and/or alternative components commonly found in a computer or various input/output devices.

96. The method of clause 1, any other suitable clauses, or any combination of suitable clauses, wherein the power source controller is capable of controlling operational functionality and/or performance of the one or more power sources and other equipment and/or parts included in the vehicle and/or powertrain to ultimately control, preserve, manage, or maintain the age and lifespan of the power sources and/or the performance and operational functionality of the vehicle and/or powertrain.

97. The method of clause 1, any other suitable clauses, or any combination of suitable clauses, wherein the power source controller is configured to be connected to and/or in communication with other components in the one or more power sources, or a fuel cell or battery system that may include valves, pipes, lines, wires, modems, conduits, manifolds, actuators, sensors, water storage tanks, hydrogen storage tanks, air storage tanks, fuel storage tanks, air supply, motors, generators, and/or drive trains.

98. The method of clause 97, any other suitable clauses, or any combination of suitable clauses, wherein the communication from the power source controller to components of the one or more power sources alters, decreases, increases, negates, or enhances the function or performance of the one or more power sources.

99. The method of clause 1, any other suitable clauses, or any combination of suitable clauses, wherein one or more of the components of the power source controller are incorproated in, or otherwise form a portion of, another component.

100. The method of clause 1, any other suitable clauses, or any combination of suitable clauses, wherein the power output for the fuel cell and/or the one or more power sources is driven by automated control.

101. The method of clause 100, any other suitable clauses, or any combination of suitable clauses, wherein the automated control of the power output of the fuel cell and/or the one or more power sources is based on the lifespan management and control strategy.

102. The method of clause 1, any other suitable clauses, or any combination of suitable clauses, wherein the one or more power sources are situated on, configured to be located on, or attached to the vehicle and/or powertrain.

103. The method of clause 1, any other suitable clauses, or any combination of suitable clauses, wherein each of the one or more power sources includes a separate individual controller for controlling that power source.

104. The method of clause 104, any other suitable clauses, or any combination of suitable clauses, wherein the individual controllers for each of the one or more power sources separately cooperates with the power source controller to control the power output for the one or more power sources.

105. The method of clause 1, any other suitable clauses, or any combination of suitable clauses, wherein each of the one or more power sources are a power sink, or can consume power as well as generate and output power.

106. The method of clause 1, any other suitable clauses, or any combination of suitable clauses, wherein each of the one or more power sources are a hybrid power source.

107. The method of clause 106, any other suitable clauses, or any combination of suitable clauses, wherein the hybrid power source includes at least two different types of power sources, at least the fuel cell or a fuel cell stack, at least the battery, and/or at least the fuel cell or the fuel cell stack and the battery.

108. The method of clause 1, any other suitable clauses, or any combination of suitable clauses, wherein each of the one or more power sources has a power source controller that is directly connected to and in communication with the one or more power sources.

109. The method of clause 1, any other suitable clauses, or any combination of suitable clauses, wherein the battery.

110. The method of clause 1, any other suitable clauses, or any combination of suitable clauses, wherein receiving one or more inputs into the processor comprises performing preliminary processing of the lifespan management and control strategy.

111. The method of clause 110, any other suitable clauses, or any combination of suitable clauses, wherein performing preliminary processing of the lifespan management and control strategy includes combining the instructions with data present on a device, translating the instructions to a different format, performing compression, decompression, encryption, and/or decryption, combining multiple files that include different sections of the instructions, integrating the instructions with other code or information present on a device.

112. The method of clause 111, any other suitable clauses, or any combination of suitable clauses, wherein the device is a library or an operating system, or similar operations.

113. The method of clause 110, any other suitable clauses, or any combination of suitable clauses, wherein performing preliminary processing of the lifespan management and control strategy is performed by the source computing device, the destination computing device, or an intermediary computing device.

114. The method of clause 1, any other suitable clauses, or any combination of suitable clauses, wherein generating the lifespan management and control strategy depends on the one or more power sources in the vehicle and/or powertrain and the information about the performance, state-of-health, age, and lifespan that the processor of the power source controller can access from each power source present in the vehicle and/or powertrain over the communication network.

115. The method of clause 1, any other suitable clauses, or any combination of suitable clauses, wherein generating the lifespan management and control strategy comprises estimating the present state-of-health of the fuel cell and/or the one or more power sources.

116. The method of clause 1, any other suitable clauses, or any combination of suitable clauses, wherein generating the lifespan management and control strategy comprises identifying a primary power source selected from all the available one or more power sources.

117. The method of clause 116, any other suitable clauses, or any combination of suitable clauses, wherein the primary power source is a single power source, a combination of more than one power source, a hybrid power source, or the battery.

118. The method of clause 1, any other suitable clauses, or any combination of suitable clauses, wherein generating the lifespan management and control strategy comprises identifying the power needs of a vehicle and/or powertrain based on certain inputs.

119. The method of clause 1, any other suitable clauses, or any combination of suitable clauses, wherein generating the lifespan management and control strategy comprises receiving inputs that enable determination of the duration of time for which power is needed and from what power source the required power will be retrieved.

120. The method of clause 119, any other suitable clauses, or any combination of suitable clauses, wherein the duration for which power is needed may be the duration that the vehicle and/or powertrain is traveling, or another duration.

121. The method of clause 1, any other suitable clauses, or any combination of suitable clauses, wherein generating the lifespan management and control strategy comprises determining the power required from the one or more power sources for maneuvering the vehicle and/or powertrain to arrive at a desired location and/or return to an original location.

122. The method of clause 1, any other suitable clauses, or any combination of suitable clauses, wherein generating the lifespan management and control strategy comprises getting inputs that enable determination of when to charge or utilize the battery as the power source versus using the fuel cell as the power source in order to maintain, preserve, and/or extend the lifespan of one or more of the power sources.

123. The method of clause 1, any other suitable clauses, or any combination of suitable clauses, wherein generating the lifespan management and control strategy comprises getting inputs that may enable determination of how much to charge the battery to ensure the state-of-health, age, or lifespan of the fuel cell is preserved, extended, and/or maintained.

124. The method of clause 1, any other suitable clauses, or any combination of suitable clauses, wherein generating the lifespan management and control strategy comprises a method to determine if the one or more power sources in the vehicle and/or powertrain or any of the inputs needed to generate the lifespan management and control strategy have been tampered with or altered.

125. The method of clause 1, any other suitable clauses, or any combination of suitable clauses, wherein generating the lifespan management and control strategy comprises getting additional inputs associated with a fuel cell or battery state of charge.

126. The method of clause 1, any other suitable clauses, or any combination of suitable clauses, wherein generating the lifespan management and control strategy comprises engaging only a subset of the one or more power sources, the fuel cells or the fuel cell stacks present on the vehicle and/or powertrain.

127. The method of clause 1, any other suitable clauses, or any combination of suitable clauses, wherein generating the lifespan management and control strategy comprises validating the lifespan management and control strategy.

128. The method of clause 127, any other suitable clauses, or any combination of suitable clauses, wherein validating the lifespan management and control strategy comprises implementing vehicle to infrastructure communication, automatic action, automatic action by the processor and/or the controller, or manual action by an operator.

129. The method of clause 127, any other suitable clauses, or any combination of suitable clauses, wherein validating the lifespan management and control strategy is performed to safeguard the one or more power sources and prevent any damage to them.

130. The method of clause 129, any other suitable clauses, or any combination of suitable clauses, wherein the one or more power sources are safeguarded against over-heating, over use, improper utilization, wear and tear, improper charging and/or improper start-up or shutdown.

131. The method of clause 127, any other suitable clauses, or any combination of suitable clauses, wherein validating the lifespan management and control strategy is performed to review all inputs used to generate the lifespan management and control strategy.

132. The method of clause 1, any other suitable clauses, or any combination of suitable clauses, wherein generating the lifespan management and control strategy comprises conducting, performing, or running an online and/or offline operational power assessment procedure.

133. The method of clause 132, any other suitable clauses, or any combination of suitable clauses, wherein the online and/or offline operational power assessment procedure generates output data and/or "outputs" during steady state operation of the fuel cell and/or the one or more power sources.

134. The method of clause 133, any other suitable clauses, or any combination of suitable clauses, wherein the output data and/or "outputs" are used to automatically and/or manually create a trend line that indicates, estimates, and/or predicts the state-of-health, age, and/or lifespan of the fuel cell and/or the one or more power sources.

135. The method of clause 133, any other suitable clauses, or any combination of suitable clauses, wherein the output data and/or "outputs" become additional inputs.

136. The method of clause 135, any other suitable clauses, or any combination of suitable clauses, wherein the additional inputs are incorporated, entered automatically, or entered manually by a user, operator, or a controller into a processor comprising mathematical formulas or algorithms.

137. The method of clause 136, any other suitable clauses, or any combination of suitable clauses, wherein the mathematical formulas or algorithms process and/or manipulate the quantitative or qualitative inputs to generate an estimated present state of health of the fuel cell and/or the one or more power sources.

138. The method of clause 137, any other suitable clauses, or any combination of suitable clauses, wherein the estimated present state of health is utilized and mathematically manipulated by algorithms in the processor to generate the lifespan management and control strategy.

139. The method of clause 132, any other suitable clauses, or any combination of suitable clauses, wherein the online and/or offline operational power assessment procedure includes starting up a first of the one or more power sources to be online, powering up the first of the one or more power sources to be operational at a first power level to draw a specfific voltage or current from the first of the one or more power sources, and/or allowing the first of the one or more power sources to be run at steady state for a time period at the first power level followed by a second power level and additional power levels until a maximum power level is reached.

140. The method of clause 139, any other suitable clauses, or any combination of suitable clauses, wherein the time period ranges from about 2 minutes to about 20 minuts, from about 5 minutes to about 10 minutes, every time period comprised within those ranges, or at, about, or no greater than about 5 minutes.

141. The method of clause 139, any other suitable clauses, or any combination of suitable clauses, wherein the first of the one or more power sources is the fuel cell.

142. The method of clause 139, any other suitable clauses, or any combination of suitable clauses, wherein the first of the one or more power sources is subsequently and repeatedly operated at the same time period and power level but at different time intervals over the course of the full runtime or life of the power source to generate output data and/or "outputs."

143. The method of clause 139, any other suitable clauses, or any combination of suitable clauses, wherein the first of the one or more power sources is powered up to be operational at a second power level to draw a specific voltage or current and/or repeated several times over a full course of operational runtime for the power source to generate "outputs" at the second power level.

144. The method of clause 139, any other suitable clauses, or any combination of suitable clauses, wherein the first of the one or more power sources is powered up to be performed at a maximum power level and/or repeated subsequently over a full course of operational runtime to generate output data and/or "outputs" up to and at the maximum power level.

145. The method of clause 132, any other suitable clauses, or any combination of suitable clauses, wherein the online and/or offline operational power assessment procedure is repeated at, about, or no more than about eight times and/or multiple times at different power levels.

146. The method of clause 132, any other suitable clauses, or any combination of suitable clauses, wherein the online and/or offline operational power assessment procedure is repeated indefinitiely when the first of the one or more power sources is a fuel cell or fuel cell stack as long as conditions are favorable and doing so is supported by a second of the one or more power sources and/or a battery.

147. The method of clause 132, any other suitable clauses, or any combination of suitable clauses, wherein the online and/or offline operational power assessment procedure is repeated a number of times ranging from about 4 to 20 times, including any specific number comprised within that range.

148. The method of clause 132, any other suitable clauses, or any combination of suitable clauses, wherein the online and/or offline operational power assessment procedure starts at or about 15 kW, then repeats in specific increments or 5 kW increments to at or about 150 kW, any specific power therein, and/or until maximum fuel power has been reached.

149. The method of clause 132, any other suitable clauses, or any combination of suitable clauses, wherein the online and/or offline operational power assessment procedure generates output data and/or "outputs" after being repeated multiple times.

150. The method of clause 132, any other suitable clauses, or any combination of suitable clauses, wherein the online and/or offline operational power assessment procedure generates information.

151. The method of clause 150, any other suitable clauses, or any combination of suitable clauses, wherein the information is stored and communicated to other components or systems as output data or "outputs."

152. The method of clause 132, any other suitable clauses, or any combination of suitable clauses, wherein the online and/or offline operational power assessment procedure is repeated several times over a full course of an operational runtime for each of the one or more power sources, is repeated at every 500 hours of operation of each of the one or more power sources, is repeated at every 500 hours of operation of the fuel cell, is repeated at every 1000 hours of operation of each of the one or more power sources, or is repeated at every 1000 hours of operation of the fuel cell.

153. The method of clause 132, any other suitable clauses, or any combination of suitable clauses, wherein the online and/or offline operational power assessment procedure is manually or automatically triggered through a physical or electronic service tool or other method during regular maintenance intervals, maintenance checks and/or preventative maintenance, such as by service, engineering, dealership, or fleet maintenance controllers, manually activated by an operator of a vehicle and/or powertrain by pressing a specific button on the vehicle dash or console or other method, initiated or triggered at the end of line testing of a new vehicle and/or powertrain with the one or more power sources, initiated or trigggered when the average power falls or has been sustained below a designated threshold and/or implemented by using look ahead electronic horizon data or other environmental, logistical, and/or geographical information to identify the opportunity on route to perform the process.

154. The method of clause 132, any other suitable clauses, or any combination of suitable clauses, wherein the online and/or offline operational power assessment procedure is performed intermittently or concurrently, and/or staggered to an extent that a controller operates the fuel cell and/or the one or more power sources at a certain power level for a time period in a steady state operating window to capture data and reverts back to normal operation.

155. The method of clause 154, any other suitable clauses, or any combination of suitable clauses, wherein the controller staggers the data capture for specific power levels over several hours or days.

156. The method of clause 154, any other suitable clauses, or any combination of suitable clauses, wherein the controller targets running the online and/or offline operational assessment procedure at the next power level at the next available opportunity.

157. The method of clause 132, any other suitable clauses, or any combination of suitable clauses, wherein the online and/or offline operational power assessment procedure is used to generate a trend line to estimate or predict the state-of-health and lifespan of the fuel cell and/or the one or more power sources as compared to steady state.

158. The method of clause 157, any other suitable clauses, or any combination of suitable clauses, wherein the estimated state-of-health of the fuel cell and/or the one or more power sources at a specific power level is used to functionally normalize the real-time or estimated present state-of-health of the fuel cell and/or the one or more power sources such that the lifespan of the fuel cell and/or the one or more power sources may be estimated, preserved, maintained, and/or extended.

159. The method of clause 157, any other suitable clauses, or any combination of suitable clauses, wherein the estimated or normalized state-of-health information is utilized as inputs by processors and/or controllers comprising one or more control algortithms and/or is communicated and/or used to generate the lifespan management and control strategy which is communicated to the power source controller.

160. The method of clause 132, any other suitable clauses, or any combination of suitable clauses, wherein the online and/or offline operational power assessment procedure is run to generate more than one data points.

161. The method of clause 160, any other suitable clauses, or any combination of suitable clauses, wherein the more than one data points are used to algorithmically generate one or more trend lines.

162. The method of clause 161, any other suitable clauses, or any combination of suitable clauses, wherein the one or more trend lines correlate with the state-of-health of the fuel cell and/or the one or more power sources and is utilized to proedict or estimate the lifespan of the fuel cell and/or the one or more power sources.

163. The method of clause 161, any other suitable clauses, or any combination of suitable clauses, wherein each of the one or more trend lines each have a slope.

164. The method of clause 163, any other suitable clauses, or any combination of suitable clauses, wherein the slope of each of the one or more trendlines is determined by calculating a height of one data point on the trend line divided by a length of the trend line from the same data point to zero.
165. The method of clause 164, any other suitable clauses, or any combination of suitable clauses, wherein the height of the trend line represents a voltage of the fuel cell or the fuel cell stack.
166. The method of clause 164, any other suitable clauses, or any combination of suitable clauses, wherein the length of the trend line represents a runtime of the fuel cell in hours.
167. The method of clause 163, any other suitable clauses, or any combination of suitable clauses, wherein the slope is measured in volts/hour.
168. The method of clause 163, any other suitable clauses, or any combination of suitable clauses, wherein the slope is used to calculate a voltage of the fuel cell and/or the one or more power sources at the end of its life.
169. The method of clause 168, any other suitable clauses, or any combination of suitable clauses, wherein the voltage at the end of life is calculated by multiplying the slope with a manufacturer's runtime hours of the fuel cell and/or the one or more power sources and adding a constant.
170. The method of clause 163, any other suitable clauses, or any combination of suitable clauses, wherein the slope is used to calculate runtime hours of the fuel cell and/or the one or more power sources at the end of its life.
171. The method of clause 170, any other suitable clauses, or any combination of suitable clauses, wherein the runtime hours at the end of life are calculated by subtracting a constant from the present voltage of the fuel cell and/or the one or more power sources and dividing that total by the slope.
172. The method of clause 170, any other suitable clauses, or any combination of suitable clauses, wherein the runtime hours at the end of life is used to determine, estimate, or normalize the state-of-health of the fuel cell and/or the one or more power sources.
173. The method of clause 172, any other suitable clauses, or any combination of suitable clauses, wherein the normalized or estimated state-of-health is determined by dividing the present, current or real-time hours of runtime by the runtime hours at the end of life, and/or by taking that number, subtracting it from 1, and multiplying it by 100%.
174. The method of clause 1, any other suitable clauses, or any combination of suitable clauses, wherein generating the lifespan management and control strategy comprises determining the power needs of the vehicle and/or powertrain or the power output of the fuel cell and/or the one or more power sources based on data and/or information provided as the one or more inputs, based on distance and conditions under which the vehicle and/or powertrain must travel, based on the current speed, velocity, current, voltage, and/or faults of the vehicle and/or powertrain as it travels on a route, based on time required to start, shut down, initiate, charge, and/or refuel the one or more power sources on the vehicle and/or powertrain, or based on one or more of the above and/or other system external input factors.
175. The method of clause 1, any other suitable clauses, or any combination of suitable clauses, wherein generating the lifespan management and control strategy comprises using a moving average filter or any alternate method to calculate, estimate, or determine average fuel cell stack voltage or current based on the output data ascertained during steady state operation of the fuel cell.
176. The method of clause 175, any other suitable clauses, or any combination of suitable clauses, wherein the average fuel cell stack voltage or current required for the fuel cell to power up to a desired operational power level is noted, recorded, and/or stored.
177. The method of clause 1, any other suitable clauses, or any combination of suitable clauses, wherein generating the lifespan management and control strategy comprises utilizing different power sources.
178. The method of clause 1, any other suitable clauses, or any combination of suitable clauses, wherein controlling the power output of the one or more power sources by the controller comprises delivering instructions to the fuel cell and/or the one or more power sources.
179. The method of clause 1, any other suitable clauses, or any combination of suitable clauses, wherein controlling the power output of the one or more power sources by the controller comprises extending the lifespan of the fuel cell and/or the one or more power sources.
180. A system for controlling the lifespan of a fuel cell, the system comprising a processor, one or more real-time inputs, a power source controller, and one or more power sources, wherein the one or more power sources are situated on, configured to be located on, or attached to a vehicle or powertrain, wherein the processor receives the one or more inputs, uses the one or more inputs to generate a lifespan management and control strategy, and communicates the lifespan management and control strategy to the power source controller, wherein the power source controller controls power output for the one or more power sources based on the lifespan management and control strategy.
181. The system of clause 180, any other suitable clauses, or any combination of suitable clauses, wherein the system enables the use of a state-of-health of the fuel cell to be mathematically manipulated in order to manage, control, and/or extend a lifespan of the fuel cell to its manufacturer expected lifespan.
182. The system of clause 181, any other suitable clauses, or any combination of suitable clauses, wherein the state-of-health is estimated or predicted based on real-time operational parameters, metrics, signals, sensors, data, algorithms, outputs, inputs and/or data compared to "start-of-life" parameters of the fuel cell and/or the one or more power sources.
183. The system of clause 181, any other suitable clauses, or any combination of suitable clauses, wherein the state-of-health is automatically and/or algorithmically reflected by generating or creating a trend line.
184. The system of clause 183, any other suitable clauses, or any combination of suitable clauses, wherein the trend line is represented by the average fuel cell stack voltage or current output data plotted on a graph along with the total runtime achieved in a time period.
185. The system of clause 183, any other suitable clauses, or any combination of suitable clauses, wherein the trend line is used to estimate or predict the state-of-health, age, and/or lifespan of the fuel cell and/or the one or more power sources.
186. The system of clause 180, any other suitable clauses, or any combination of suitable clauses, wherein the system is a control system.
187. The system of clause 180, any other suitable clauses, or any combination of suitable clauses, wherein the system comprises a system controller or computing device to facilitate the transfer of data from the one or more power source controllers and/or other network communications as input.
188. The system of clause 187, any other suitable clauses, or any combination of suitable clauses, wherein the system controller or computing device is in communication over a network with other components of the control system, the power source controller, the one or more power sources in the vehicle and/or powertrain, and/or other components of the vehicle and/or powertrain that determine and/or effect function and performance.
189. The system of clause 187, any other suitable clauses, or any combination of suitable clauses, wherein the system controller or computing device is a stand-alone server, a rack-mounted server, a blade server, or another server, a physical network appliance, a virtual network appliance, a high-performance computing device, a web appliance, a distributed computing system, a computer, a processor-based system, a multiprocessor system, a smartphone, a tablet computer, a laptop computer, a notebook computer, a mobile computing device, or any type of computation or computer device capable of performing the functions described herein.
190. The system of clause 187, any other suitable clauses, or any combination of suitable clauses, wherein the system controller and the power source controller are comprised in the same device or are separate and different controllers that are independently and directly connected to and in communication with the one or more power sources.
191. The system of clause 187, any other suitable clauses, or any combination of suitable clauses, wherein the system controller or computing device includes one or more of an input/output subsystem, a memory, a processor, a data storage device, a communication subsystem, and a display that may be connected to each other, in communication with each other, and/or configured to be connected and/or in communication with each other through wired, wireless and/or power line connections and associated protocols, or through Ethernet, InfiniBand®, Bluetooth®, Wi-Fi®, WiMAX, 3G, 4G LTE, or 5G.
192. The system of clause 191, any other suitable clauses, or any combination of suitable clauses, wherein the memory is incorporated in the processor.
193. The system of clause 191, any other suitable clauses, or any combination of suitable clauses, wherein the processor is a single or multi-core processor(s), digital signal processor, microcontroller, or other processor or processing/controlling circuit, or any type of computational processing tool or equipment capable of performing the functions described herein.
194. The system of clause 191, any other suitable clauses, or any combination of suitable clauses, wherein the memory is any type of volatile or non-volatile memory or data storage capable of performing the functions described herein.
195. The system of clause 191, any other suitable clauses, or any combination of suitable clauses, wherein the memory stores operating systems, applications, programs, libraries, drivers, or various data and software used during operation of the system controller.
196. The system of clause 191, any other suitable clauses, or any combination of suitable clauses, wherein the memory is directly and communicatively coupled to the processor and/or via an integrated memory controller hub and/or via the input/output subsystem.
197. The system of clause 191, any other suitable clauses, or any combination of suitable clauses, wherein the input/output subsystem is or otherwise includes memory controller hubs, input/output control hubs, sensor hubs, host controllers, firmware devices, communication links, point-to-point links, bus links, wires, cables, light guides, printed circuit board traces, and/or other circuitry and/or components and subsystems to facilitate the input/output operations.
198. The system of clause 191, any other suitable clauses, or any combination of suitable clauses, wherein the input/output subsystem forms a portion of a system-on-a-chip.
199. wherein the input/output subsystem, the processor, the memory, and/or other components of the system controller are incorporated on a single integrated circuit chip.
200. The system of clause 191, any other suitable clauses, or any combination of suitable clauses, wherein the data storage device is a memory device and circuit, a memory card, a hard disk drive, a solid-state drive, or any type of device or devices configured for short-term or long-term storage of data.
201. The system of clause 191, any other suitable clauses, or any combination of suitable clauses, wherein the communication subsystem is any communication circuit, device, or collection capable of enabling communications between the system controller and other remote devices over the computer network.
202. The system of clause 191, any other suitable clauses, or any combination of suitable clauses, wherein the communication subsystem is configured to use any one or more communication technologies, wired, wireless, cloud-based, and/or power line communications, and Ethernet, InfiniBand®, Bluetooth®, Wi-Fi®, WiMAX, 3G, 4G LTE, 5G, or other associated protocols.
203. The system of clause 191, any other suitable clauses, or any combination of suitable clauses, wherein the display is a liquid crystal display, a light emitting diode, a plasma display, a cathod ray tube, or any type of display device capable of displaying digital and/or electronic information.
204. The system of clause 191, any other suitable clauses, or any combination of suitable clauses, wherein the display is coupled to or otherwise includes a touch screen or other input device.
205. The system of clause 187, any other suitable clauses, or any combination of suitable clauses, wherein the system controller or computing device includes any number of additional input/output devices, interface devices, hardware accelerators, other peripheral devices, and/or additional and/or alternative components commonly found in a computer or various input/output devices.
206. The system of clause 187, any other suitable clauses, or any combination of suitable clauses, wherein the system controller and the power source controller are configured into separate subsystems for managing data and coordinating communications throught the vehicle and/or powertrain.
207. The system of clause 187, any other suitable clauses, or any combination of suitable clauses, wherein one or more of the components of the system controller are incorproated in, or otherwise form a portion of, another component.
208. The system of clause 187, any other suitable clauses, or any combination of suitable clauses, wherein the system controller, the power source controller, the one or more power sources, additional devices or components, and/or additional features or components of the vehicle and/or powertrain are connected, communicate with each other, and/or configured to be connected or in communication over the network using one or more communication technologies, wired, wireless, cloud-based, and/or power line communications, and Ethernet, InfiniBand®, Bluetooth®, Wi-Fi®, WiMAX, 3G, 4G LTE, 5G, or other associated protocols.

209. The system of clause 180, any other suitable clauses, or any combination of suitable clauses, wherein the system is configured to selectively control a first primary power source with a first lifespan management and control strategy and selectively control a second primary power source with a second lifespan management and control strategy.

210. The system of clause 209, any other suitable clauses, or any combination of suitable clauses, wherein the one or more lifespan management and control strategies implement selective utilization of one or more power sources.

211. The system of clause 210, any other suitable clauses, or any combination of suitable clauses, wherein selective utilization of the one or more power sources includes utilizing only a portion of the primary power source versus the full primary power source.

212. The system of clause 210, any other suitable clauses, or any combination of suitable clauses, wherein selective utilization of the one or more power sources includes limiting, reducing, and/or regulating the power capacity provided by any proportion of fuel cells of the total fuel cell stack that is operation.

213. The system of clause 210, any other suitable clauses, or any combination of suitable clauses, wherein selective utilization of the one or more power sources includes operating the one or more power sources at any capacity ranging from about 0% to about 100%, or any specific operational capacity percentage comprised therein.

214. The system of clause 180, any other suitable clauses, or any combination of suitable clauses, wherein the system is configured to conduct operational performance tests on the one or more power sources.

215. The system of clause 214, any other suitable clauses, or any combination of suitable clauses, wherein conducting operational performance tests on the one or more power sources estimates and/or predicts the current or real-time state-of-health, age, and/or lifespan of the one or more power sources.

216. The system of clause 215, any other suitable clauses, or any combination of suitable clauses, wherein the information collected from conducting operational performance tests is implemented into the one or more power sources to effectuate the utility, facilitation, preservation, and/or maintenance of the estimated present state-of-health of the one or more power sources.

217. The system of clause 180, any other suitable clauses, or any combination of suitable clauses, wherein the fuel cell is a solid oxide fuel cell, a proton exchange membrane fuel cell, a phsophoric acid fuel cell, or a molten carbonate fuel cell.

218. The system of clause 180, any other suitable clauses, or any combination of suitable clauses, wherein the fuel cell is in a vehicle and/or powertrain.

219. The system of clause 218, any other suitable clauses, or any combination of suitable clauses, wherein the vehicle and/or powertrain is a a vessel, a marine vehicle or vessel, a train, a locomotive, a bus, a trolley, a mining equipment, an automobile, an equipment or a device used on rail, used on the waterways, used on-highways, used off-highways, used in high altitude regions, or used underground, or a plane, a helicopter, a drone, a hot hair balloon, or other aircrafts or aerial crafts.

220. The system of clause 218, any other suitable clauses, or any combination of suitable clauses, wherein the vehicle and/or powertrain is powered by one or more fuel cells accompanied by one or more high voltage patteries, ultra capacitors, or any type of power source or sink.

221. The system of clause 218, any other suitable clauses, or any combination of suitable clauses, wherein the vehicle and/or powertrain is powered by an engine, the fuel cell or fuel cell stack, and the battery.

222. The system of clause 218, any other suitable clauses, or any combination of suitable clauses, the vehicle and/or powertrain may comprise a primary power source that comprises multiple, duplicative power sources, multiple fuel cell stacks, multiple batteries, or combinations thereof.

223. The system of clause 180, any other suitable clauses, or any combination of suitable clauses, wherein the fuel cell includes one or more, multiple, and/or a plurality of fuel cells, fuel cell stacks, and/or fuel cell modules in a system.

224. The system of clause 180, any other suitable clauses, or any combination of suitable clauses, wherein the processor is the system controller processor, the power source controller processor, or both.

225. The system of clause 180, any other suitable clauses, or any combination of suitable clauses, wherein the processor receives the one or more inputs, uses the one or more inputs to generate the lifespan management and control strategy, and communicates the lifespan management and control strategy to the power source controller.

226. The system of clause 180, any other suitable clauses, or any combination of suitable clauses, wherein the processor, the controller, and the one or more power sources are part of a feedback loop.

227. The system of clause 180, any other suitable clauses, or any combination of suitable clauses, wherein the processor, after receiving the one or more inputs, is configured to perform preliminary processing of the lifespan management and control strategy.

228. The system of clause 227, any other suitable clauses, or any combination of suitable clauses, wherein performing preliminary processing of the lifespan management and control strategy includes combining the instructions with data present on a device, translating the instructions to a different format, performing compression, decompression, encryption, and/or decryption, combining multiple files that include different sections of the instructions, integrating the instructions with other code or information present on a device.

229. The system of clause 228, any other suitable clauses, or any combination of suitable clauses, wherein the device is a library or an operating system, or similar operations 230. The system of clause 227, any other suitable clauses, or any combination of suitable clauses, wherein performing preliminary processing of the lifespan management and control strategy is performed by the source computing device, the destination computing device, or an intermediary computing device.

231. The system of clause 180, any other suitable clauses, or any combination of suitable clauses, wherein the processor, when generating the lifespan management and control strategy, is configured to rely on the one or more power sources in the vehicle and/or powertrain and the information about the performance, state-of-health, age, and lifespan that the processor of the power source controller can access from each power source present in the vehicle and/or powertrain over the communication network.

232. The system of clause 180, any other suitable clauses, or any combination of suitable clauses, wherein the processor, when generating the lifespan management and control strategy, is configured to estimate the present state-of-health of the fuel cell and/or the one or more power sources.

233. The system of clause 180, any other suitable clauses, or any combination of suitable clauses, wherein the processor, when generating the lifespan management and control strategy, is configured to identify a primary power source selected from all the available one or more power sources.

234. The system of clause 233, any other suitable clauses, or any combination of suitable clauses, wherein the primary power source is a single power source, a combination of more than one power source, a hybrid power source, or the battery.

235. The system of clause 180, any other suitable clauses, or any combination of suitable clauses, wherein the processor, when generating the lifespan management and control strategy, is configured to identify the power needs of a vehicle and/or powertrain based on certain inputs.

236. The system of clause 180, any other suitable clauses, or any combination of suitable clauses, wherein the processor, when generating the lifespan management and control strategy, is configured to receive inputs that enable determination of the duration of time for which power is needed and from what power source the required power will be retrieved.

237. The system of clause 236, any other suitable clauses, or any combination of suitable clauses, wherein the duration for which power is needed may be the duration that the vehicle and/or powertrain is traveling, or another duration.

238. The system of clause 180, any other suitable clauses, or any combination of suitable clauses, wherein the processor, when generating the lifespan management and control strategy, is configured to determine the power required from the one or more power sources for maneuvering the vehicle and/or powertrain to arrive at a desired location and/or return to an original location.

239. The system of clause 180, any other suitable clauses, or any combination of suitable clauses, wherein the processor, when generating the lifespan management and control strategy, is configured to get inputs that enable determination of when to charge or utilize the battery as the power source versus using the fuel cell as the power source in order to maintain, preserve, and/or extend the lifespan of one or more of the power sources.

240. The system of clause 180, any other suitable clauses, or any combination of suitable clauses, wherein the processor, when generating the lifespan management and control strategy, is configured to get inputs that may enable determination of how much to charge the battery to ensure the state-of-health, age, or lifespan of the fuel cell is preserved, extended, and/or maintained.

241. The system of clause 180, any other suitable clauses, or any combination of suitable clauses, wherein the processor, when generating the lifespan management and control strategy, is configured to determine if the one or more power sources in the vehicle and/or powertrain or any of the inputs needed to generate the lifespan management and control strategy have been tampered with or altered.

242. The system of clause 180, any other suitable clauses, or any combination of suitable clauses, wherein the processor, when generating the lifespan management and control strategy, is configured to get additional inputs associated with a fuel cell or battery state of charge.

243. The system of clause 180, any other suitable clauses, or any combination of suitable clauses, wherein the processor, when generating the lifespan management and control strategy, is configured to engage only a subset of the one or more power sources, the fuel cells or the fuel cell stacks present on the vehicle and/or powertrain 244. The system of clause 180, any other suitable clauses, or any combination of suitable clauses, wherein the processor, when generating the lifespan management and control strategy, is configured to validate the lifespan management and control strategy.

245. The system of clause 244, any other suitable clauses, or any combination of suitable clauses, wherein validating the lifespan management and control strategy comprises implementing vehicle to infrastructure communication, automatic action, automatic action by the processor and/or the controller, or manual action by an operator.

246. The system of clause 244, any other suitable clauses, or any combination of suitable clauses, wherein validating the lifespan management and control strategy is performed to safeguard the one or more power sources and prevent any damage to them.

247. The system of clause 246, any other suitable clauses, or any combination of suitable clauses, wherein the one or more power sources are safeguarded against over-heating, over use, improper utilization, wear and tear, improper charging and/or improper start-up or shutdown.

248. The system of clause 244, any other suitable clauses, or any combination of suitable clauses, wherein validating the lifespan management and control strategy is performed to review all inputs used to generate the lifespan management and control strategy.

249. The system of clause 180, any other suitable clauses, or any combination of suitable clauses, wherein the processor, when generating the lifespan management and control strategy, is configured conduct, perform, or run an online and/or offline operational power assessment procedure.

250. The system of clause 249, any other suitable clauses, or any combination of suitable clauses, wherein the online and/or offline operational power assessment procedure generates output data and/or "outputs" during steady state operation of the fuel cell and/or the one or more power sources.

251. The system of clause 250, any other suitable clauses, or any combination of suitable clauses, wherein the output data and/or "outputs" are used to automatically and/or manually create a trend line that indicates, estimates, and/or predicts the state-of-health, age, and/or lifespan of the fuel cell and/or the one or more power sources.

252. The system of clause 250, any other suitable clauses, or any combination of suitable clauses, wherein the output data and/or "outputs" become additional inputs.

253. The system of clause 252, any other suitable clauses, or any combination of suitable clauses, wherein the additional inputs are incorporated, entered automatically, or entered manually by a user, operator, or a controller into a processor comprising mathematical formulas or algorithms.

254. The system of clause 253, any other suitable clauses, or any combination of suitable clauses, wherein the mathematical formulas or algorithms process and/or manipulate the quantitative or qualitative inputs to generate an estimated present state of health of the fuel cell and/or the one or more power sources.

255. The system of clause 254, any other suitable clauses, or any combination of suitable clauses, wherein the estimated present state of health is utilized and mathematically manipulated by algorithms in the processor to generate the lifespan management and control strategy.

256. The system of clause 249, any other suitable clauses, or any combination of suitable clauses, wherein the online and/or offline operational power assessment procedure includes starting up a first of the one or more power sources to be online, powering up the first of the one or more power sources to be operational at a first power level to draw a specfific voltage or current from the first of the one or more power sources, and/or allowing the first of the one or more power sources to be run at steady state for a time period at the first power level followed by a second power level and additional power levels until a maximum power level is reached.

257. The system of clause 256, any other suitable clauses, or any combination of suitable clauses, wherein the time period ranges from about 2 minutes to about 20 minuts, from about 5 minutes to about 10 minutes, every time period comprised within those ranges, or at, about, or no greater than about 5 minutes.

258. The system of clause 256, any other suitable clauses, or any combination of suitable clauses, wherein the first of the one or more power sources is the fuel cell.

259. The system of clause 256, any other suitable clauses, or any combination of suitable clauses, wherein the first of the one or more power sources is subsequently and repeatedly operated at the same time period and power level but at different time intervals over the course of the full runtime or life of the power source to generate output data and/or "outputs."

260. The system of clause 256, any other suitable clauses, or any combination of suitable clauses, wherein the first of the one or more power sources is powered up to be operational at a second power level to draw a specific voltage or current and/or repeated several times over a full course of operational runtime for the power source to generate "outputs" at the second power level.

261. The system of clause 256, any other suitable clauses, or any combination of suitable clauses, wherein the first of the one or more power sources is powered up to be performed at a maximum power level and/or repeated subsequently over a full course of operational runtime to generate output data and/or "outputs" up to and at the maximum power level.

262. The system of clause 249, any other suitable clauses, or any combination of suitable clauses, wherein the online and/or offline operational power assessment procedure is repeated at, about, or no more than about eight times and/or multiple times at different power levels.

263. The system of clause 249, any other suitable clauses, or any combination of suitable clauses, wherein the online and/or offline operational power assessment procedure is repeated indefinitiely when the first of the one or more power sources is a fuel cell or fuel cell stack as long as conditions are favorable and doing so is supported by a second of the one or more power sources and/or a battery.

264. The system of clause 249, any other suitable clauses, or any combination of suitable clauses, wherein the online and/or offline operational power assessment procedure is repeated a number of times ranging from about 4 to 20 times, including any specific number comprised within that range.

265. The system of clause 249, any other suitable clauses, or any combination of suitable clauses, wherein the online and/or offline operational power assessment procedure starts at or about 15 kW, then repeats in specific increments or 5 kW increments to at or about 150 kW, any specific power therein, and/or until maximum fuel power has been reached.

266. The system of clause 249, any other suitable clauses, or any combination of suitable clauses, wherein the online and/or offline operational power assessment procedure generates output data and/or "outputs" after being repeated multiple times.

267. The system of clause 249, any other suitable clauses, or any combination of suitable clauses, wherein the online and/or offline operational power assessment procedure generates information.

268. The system of clause 267, any other suitable clauses, or any combination of suitable clauses, wherein the information is stored and communicated to other components or systems as output data or "outputs."

269. The system of clause 249, any other suitable clauses, or any combination of suitable clauses, wherein the online and/or offline operational power assessment procedure is repeated several times over a full course of an operational runtime for each of the one or more power sources, is repeated at every 500 hours of operation of each of the one or more power sources, is repeated at every 500 hours of operation of the fuel cell, is repeated at every 1000 hours of operation of each of the one or more power sources, or is repeated at every 1000 hours of operation of the fuel cell.

270. The system of clause 249, any other suitable clauses, or any combination of suitable clauses, wherein the online and/or offline operational power assessment procedure is manually or automatically triggered through a physical or electronic service tool or other method during regular maintanence intervals, maintenance checks and/or preventative maintenance, such as by service, engineering, dealership, or fleet maintenance controllers, manually activated by an operator of a vehicle and/or powertrain by pressing a specific button on the vehicle dash or console or other method, initiated or triggered at the end of line testing of a new vehicle and/or powertrain with the one or more power sources, initiated or trigggered when the average power falls or has been sustained below a designated threshold and/or implemented by using look ahead electronic horizon data or other environmental, logistical, and/or geographical information to identify the opportunity on route to perform the process.

271. The system of clause 249, any other suitable clauses, or any combination of suitable clauses, wherein the online and/or offline operational power assessment procedure is performed intermittently or concurrently, and/or staggered to an extent that a controller operates the fuel cell and/or the one or more power sources at a certain power level for a time period in a steady state operating window to capture data and reverts back to normal operation.

272. The system of clause 271, any other suitable clauses, or any combination of suitable clauses, wherein the controller staggers the data capture for specific power levels over several hours or days.

273. The system of clause 271, any other suitable clauses, or any combination of suitable clauses, wherein the controller targets running the online and/or offline operational assessment procedure at the next power level at the next available opportunity.

274. The system of clause 249, any other suitable clauses, or any combination of suitable clauses, wherein the online and/or offline operational power assessment procedure is used to generate a trend line to estimate or predict the state-of-health and lifespan of the fuel cell and/or the one or more power sources as compared to steady state.

275. The system of clause 274, any other suitable clauses, or any combination of suitable clauses, wherein the estimated state-of-health of the fuel cell and/or the one or more power sources at a specific power level is used to functionally normalize the real-time or estimated present state-of-health of the fuel cell and/or the one or more power sources such that the lifespan of the fuel cell and/or the one or more power sources may be estimated, preserved, maintained, and/or extended.

276. The system of clause 274, any other suitable clauses, or any combination of suitable clauses, wherein the estimated or normalized state-of-health information is utilized as inputs by processors and/or controllers comprising one or more control algorithms and/or is communicated and/or used to generate the lifespan management and control strategy which is communicated to the power source controller.

277. The system of clause 249, any other suitable clauses, or any combination of suitable clauses, wherein the online and/or offline operational power assessment procedure is run to generate more than one data points.

278. The system of clause 277, any other suitable clauses, or any combination of suitable clauses, wherein the more than one data points are used to algorithmically generate one or more trend lines.

279. The system of clause 278, any other suitable clauses, or any combination of suitable clauses, wherein the one or more trend lines correlate with the state-of-health of the fuel cell and/or the one or more power sources and is utilized to proedict or estimate the lifespan of the fuel cell and/or the one or more power sources.

280. The system of clause 278, any other suitable clauses, or any combination of suitable clauses, wherein each of the one or more trend lines each have a slope.

281. The system of clause 280, any other suitable clauses, or any combination of suitable clauses, wherein the slope of each of the one or more trendlines is determined by calculating a height of one data point on the trend line divided by a length of the trend line from the same data point to zero.

282. The system of clause 281, any other suitable clauses, or any combination of suitable clauses, wherein the height of the trend line represents a voltage of the fuel cell or the fuel cell stack.

283. The system of clause 281, any other suitable clauses, or any combination of suitable clauses, wherein the length of the trend line represents a runtime of the fuel cell in hours.

284. The system of clause 280, any other suitable clauses, or any combination of suitable clauses, wherein the slope is measured in volts/hour.

285. The system of clause 280, any other suitable clauses, or any combination of suitable clauses, wherein the slope is used to calculate a voltage of the fuel cell and/or the one or more power sources at the end of its life.

286. The system of clause 285, any other suitable clauses, or any combination of suitable clauses, wherein the voltage at the end of life is calculated by multiplying the slope with a manufacturer's runtime hours of the fuel cell and/or the one or more power sources and adding a constant.

287. The system of clause 280, any other suitable clauses, or any combination of suitable clauses, wherein the slope is used to calculate runtime hours of the fuel cell and/or the one or more power sources at the end of its life.

288. The system of clause 287, any other suitable clauses, or any combination of suitable clauses, wherein the runtime hours at the end of life are calculated by subtracting a constant from the present voltage of the fuel cell and/or the one or more power sources and dividing that total by the slope.

289. The system of clause 287, any other suitable clauses, or any combination of suitable clauses, wherein the runtime hours at the end of life is used to determine, estimate, or normalize the state-of-health of the fuel cell and/or the one or more power sources.

290. The system of clause 289, any other suitable clauses, or any combination of suitable clauses, wherein the normalized or estimated state-of-health is determined by dividing the present, current or real-time hours of runtime by the runtime hours at the end of life, and/or by taking that number, subtracting it from 1, and multiplying it by 100%.

291. The system of clause 180, any other suitable clauses, or any combination of suitable clauses, wherein the processor, when generating the lifespan management and control strategy, is configured to determine the power needs of the vehicle and/or powertrain or the power output of the fuel cell and/or the one or more power sources based on data and/or information provided as the one or more inputs, based on distance and conditions under which the vehicle and/or powertrain must travel, based on the current speed, velocity, current, voltage, and/or faults of the vehicle and/or powertrain as it travels on a route, based on time required to start, shut down, initiate, charge, and/or refuel the one or more power sources on the vehicle and/or powertrain, or based on one or more of the above and/or other system external input factors.

292. The system of clause 180, any other suitable clauses, or any combination of suitable clauses, wherein the processor, when generating the lifespan management and control strategy, is configured to use a moving average filter or any alternate method to calculate, estimate, or determine average fuel cell stack voltage or current based on the output data ascertained during steady state operation of the fuel cell.

293. The system of clause 292, any other suitable clauses, or any combination of suitable clauses, wherein the average fuel cell stack voltage or current required for the fuel cell to power up to a desired operational power level is noted, recorded, and/or stored.

294. The system of clause 180, any other suitable clauses, or any combination of suitable clauses, wherein the processor, when generating the lifespan management and control strategy, is configured to utilize different power sources.

295. The system of clause 180, any other suitable clauses, or any combination of suitable clauses, wherein the one or more inputs are from the fuel cell or the one or more power sources and/or the vehicle and/or powertrain.

296. The system of clause 180, any other suitable clauses, or any combination of suitable clauses, wherein the one or more inputs include battery power limit, state-of-charge of the battery or the fuel cell, coolant flow, ambient temperature, no fault operations or fault conditions, average or current power levels, voltage, current, look ahead data and information, weather, road and/or sea conditions, or specific age, lifespan, or state-of-health parameters or metrics about the fuel cell and/or the one or more power sources.

297. The system of clause 180, any other suitable clauses, or any combination of suitable clauses, wherein the one or more inputs are used to generate the lifespan management and control strategy.

298. The system of clause 180, any other suitable clauses, or any combination of suitable clauses, wherein the one or more inputs are collected from one or more sensors or hydrogen sensors on the vehicle and/or powertrain.
299. The system of clause 180, any other suitable clauses, or any combination of suitable clauses, wherein the one or more inputs are collected from one or more sensors or hydrogen sensors on the vehicle and/or powertrain to determine that the state-of-health of the one or more power sources is suboptimal.
300. The system of clause 299, any other suitable clauses, or any combination of suitable clauses, wherein when the state-of-health of the one or more power sources is suboptimal, instructions established by the processor are communicated to the controller and to an exhaust, a tank, or additional vehicle components to implement or utilize a different power source, or to change, reduce, and/or shutdown the operational level of the suboptimal power source, and/or start up or increase the power provided by a separate or different power source.
301. The system of clause 180, any other suitable clauses, or any combination of suitable clauses, wherein the power source controller controls power output for the fuel cell and/or the one or more power sources based on the lifespan management and control strategy.
302. The system of clause 180, any other suitable clauses, or any combination of suitable clauses, wherein the power source controller or processor has algorithms which generate the lifespan management and control strategy based on the estimated or normalized state-of-health, the lifespan estimation, and/or additional inputs that is communicated to the fuel cell and/or the one or more power sources such that its age or lifespan may be preserved, maintained, and/or extended.
303. The system of clause 180, any other suitable clauses, or any combination of suitable clauses, wherein the power source controller or operator is located at or employed by a manufacturer, a designer, a factory, a service center, a distributor, and/or a dealer of the vehicle and/or powertrain and/or the fuel cell module or system, and/or located near, attached to, connected with, within the same room, within vicinity of the fuel cell, and/or located far from and/or outside of the same room or general vicinity of the fuel cell.
304. The system of clause 180, any other suitable clauses, or any combination of suitable clauses, wherein the power source controller is present on the vehicle and/or powertrain, not present on the vehicle and/or powertrain, remotely, automatically, programmatically, systemically, or locally controlled and/or activated on the vehicle and/or powertrain, or remotely, automatically, programmatically, systemically, or locally controlled and/or activated on the vehicle and/or powertrain by a user or an operator.
305. The system of clause 180, any other suitable clauses, or any combination of suitable clauses, wherein the power source controller can control the fuel cell and/or the one or more power sources from a distance or remotely.
306. The system of clause 180, any other suitable clauses, or any combination of suitable clauses, wherein the power source controller or operator is a human, a robot, a computer, comprises both human intervention and automated application and/or implementation of the lifespan management and control strategy, does not comprise human intervention at all or comprises substantially limited human intervention, and/or applies and/or implements the lifespan management and control strategy on the fuel cell and/or the one or more power sources automatically and/or electronically.
307. The system of clause 180, any other suitable clauses, or any combination of suitable clauses, wherein the power source controller is a stand-alone server, a rack-mounted server, a blade server, or another server, a physical network appliance, a virtual network appliance, a high-performance computing device, a web appliance, a distributed computing system, a computer, a processor-based system, a multiprocessor system, a smartphone, a tablet computer, a laptop computer, a notebook computer, a mobile computing device, or any type of computation or computer device capable of performing the functions described herein.
308. The system of clause 180, any other suitable clauses, or any combination of suitable clauses, wherein only the power source controller is directly connected to and in communication with the one or more power sources.
309. The system of clause 180, any other suitable clauses, or any combination of suitable clauses, wherein the power source controller and its respective compones are in the same system controller or computing device as the system processor.
310. The system of clause 180, any other suitable clauses, or any combination of suitable clauses, wherein the power source controller includes one or more of an input/output (I/O) subsystem, a memory, a processor, a data storage device, a communication subsystem, and/or a display that may be connected to each other, in communication with each other, and/or configured to be connected and/or in communication with each other through wired, wireless and/or power line connections and associated protocols, or through Ethernet, InfiniBand®, Bluetooth®, Wi-Fi®, WiMAX, 3G, 4G LTE, or 5G.
311. The system of clause 310, any other suitable clauses, or any combination of suitable clauses, wherein the input/output subsystem, the processor, the memory, and/or other components of the power source controller are incorporated on a single integrated circuit chip.
312. The system of clause 310, any other suitable clauses, or any combination of suitable clauses, wherein the communication subsystem is any communication circuit, device, or collection capable of enabling communications between the power source controller and other remote devices over the computer network.
313. The system of clause 180, any other suitable clauses, or any combination of suitable clauses, wherein the power source controller or computing device includes any number of additional input/output devices, interface devices, hardware accelerators, other peripheral devices, and/or additional and/or alternative components commonly found in a computer or various input/output devices.
314. The system of clause 180, any other suitable clauses, or any combination of suitable clauses, wherein the power source controller is capable of controlling operational functionality and/or performance of the one or more power sources and other equipment and/or parts included in the vehicle and/or powertrain to ultimately control, preserve, manage, or maintain the age and lifespan of the power sources and/or the performance and operational functionality of the vehicle and/or powertrain.
315. The system of clause 180, any other suitable clauses, or any combination of suitable clauses, wherein the power source controller is configured to be connected to and/or in communication with other components in the one or more power sources, or a fuel cell or battery system that may include valves, pipes, lines, wires, modems, conduits, manifolds, actuators, sensors, water storage tanks, hydrogen storage tanks, air storage tanks, fuel storage tanks, air supply, motors, generators, and/or drive trains.

316. The system of clause 315, any other suitable clauses, or any combination of suitable clauses, wherein the communication from the power source controller to components of the one or more power sources alters, decreases, increases, negates, or enhances the function or performance of the one or more power sources.

317. The system of clause 180, any other suitable clauses, or any combination of suitable clauses, wherein one or more of the components of the power source controller are incorproated in, or otherwise form a portion of, another component.

318. The system of clause 180, any other suitable clauses, or any combination of suitable clauses, wherein the power source controller, when controlling the power output of the one or more power sources, is configured to deliver instructions to the fuel cell and/or the one or more power sources.

319. The system of clause 180, any other suitable clauses, or any combination of suitable clauses, wherein the power source controller, when controlling the power output of the one or more power sources, is configured to extend the lifespan of the fuel cell and/or the one or more power sources.

320. The system of clause 180, any other suitable clauses, or any combination of suitable clauses, wherein the one or more power sources are selected from a fuel cell, a battery, and a combination thereof. wherein the vehicle and/or powertrain.

321. The system of clause 180, any other suitable clauses, or any combination of suitable clauses, wherein the one or more power sources are situated on, configured to be located on, or attached to the vehicle and/or powertrain.

322. The system of clause 180, any other suitable clauses, or any combination of suitable clauses, wherein each of the one or more power sources includes a separate individual controller for controlling that power source.

323. The system of clause 322, any other suitable clauses, or any combination of suitable clauses, wherein the individual controllers for each of the one or more power sources separately cooperates with the power source controller to control the power output for the one or more power sources.

324. The system of clause 180, any other suitable clauses, or any combination of suitable clauses, wherein each of the one or more power sources are a power sink, or can consume power as well as generate and output power.

325. The system of clause 180, any other suitable clauses, or any combination of suitable clauses, wherein each of the one or more power sources are a hybrid power source.

326. The system of clause 325, any other suitable clauses, or any combination of suitable clauses, wherein the hybrid power source includes at least two different types of power sources, at least the fuel cell or a fuel cell stack, at least the battery, and/or at least the fuel cell or the fuel cell stack and the battery.

327. The system of clause 180, any other suitable clauses, or any combination of suitable clauses, wherein each of the one or more power sources has a power source controller that is directly connected to and in communication with the one or more power sources.

328. The system of clause 180, any other suitable clauses, or any combination of suitable clauses, wherein the lifespan management and control strategy comprises the one or more inputs, the estimated present state-of-health and the estimated lifespan of the fuel cell and/or the one or more power sources.

329. The system of clause 180, any other suitable clauses, or any combination of suitable clauses, wherein the lifespan management and control strategy comprises and considers the estimated lifespan of the fuel cell and/or the one or more power sources.

330. The system of clause 180, any other suitable clauses, or any combination of suitable clauses, wherein the lifespan management and control strategy is employed by the use of trend line outputs, remaining age, remaining power, averaging remaining life (in hours) at each power level, determining the minimum life remaining (in hours) at each power level, and utilizing a normalized value on 0-100% scale at each power levels, or combinations thereof.

331. The system of clause 180, any other suitable clauses, or any combination of suitable clauses, wherein the lifespan management and control strategy is implemented using vehicle and/or powertrain controls.

332. The system of clause 180, any other suitable clauses, or any combination of suitable clauses, wherein the lifespan management and control strategy is applied or implemented on the fuel source, the battery, and/or the one or more power sources by the power source controller and a power source processor.

333. The system of clause 180, any other suitable clauses, or any combination of suitable clauses, wherein the lifespan management and control strategy is applied or implemented in hardware, firmware, software, or any combination, or as instructions carried by or stored on a transitory or non-transitory machine-readable storage medium and/or a transitory or non-transitory computer-readable storage medium.

334. The system of clause 333, any other suitable clauses, or any combination of suitable clauses, wherein the transitory or non-transitory machine-readable storage medium and/or the transitory or non-transitory computer-readable storage medium is read and executed by one or more processors.

335. The system of clause 333, any other suitable clauses, or any combination of suitable clauses, wherein the transitory or non-transitory machine-readable storage medium and/or the transitory or non-transitory computer-readable storage medium is any storage device, mechanism, or other physical structure for storing or transmitting information in a form readable by a machine, a computer, a volatile or non-volatile memory, a media disc, or other media device.

336. The system of clause 180, any other suitable clauses, or any combination of suitable clauses, wherein the lifespan management and control strategy is encoded as a set of preliminary instructions and/or encoded on a machine-readable or computer-readable storage medium that requires preliminary processing operations by a source compute device.

337. The system of clause 336, any other suitable clauses, or any combination of suitable clauses, wherein the source compute device is one or more processors.

338. The system of clause 337, any other suitable clauses, or any combination of suitable clauses, wherein the one or more processors comprise control algorithms to determine the current or real-time state-of-health that broadcast instructions and/or information on the Controller Area Network or LIN system of the vehicle and/or powertrain system.

339. The system of clause 336, any other suitable clauses, or any combination of suitable clauses, wherein the source compute device prepares the instructions for execution on a destination compute device.
340. The system of clause 180, any other suitable clauses, or any combination of suitable clauses, wherein the lifespan management and control strategy is generated by the processor based on several inputs and applied or implemented by the power source controller to affect the functioning of the one or more power sources and the vehicle and/or powertrain.
341. The system of clause 340, any other suitable clauses, or any combination of suitable clauses, wherein the inputs are provided by an operator or publicly or privately available information.
342. The system of clause 340, any other suitable clauses, or any combination of suitable clauses, wherein the implementation by the power source controller is in real time or automatically.
343. The system of clause 180, any other suitable clauses, or any combination of suitable clauses, wherein the lifespan management and control strategy is tailored by an operator based on the operating condition of the one or more power sources, review of the inputs, review of any tampering, the location, region, or conditions where the vehicle and/or powertrain is operating, and/or the time required by the vehicle and/or powertrain to travel and/or return from any destination.
344. The system of clause 343, any other suitable clauses, or any combination of suitable clauses, wherein the tailoring of the lifespan management and control strategy is manipulation of the system and/or method inputs, controls, and/or performance by an operator.
345. The system of clause 343, any other suitable clauses, or any combination of suitable clauses, wherein the tailoring of the lifespan management and control strategy is warranted and utilized when specific, detailed, and/or updated information is available to an operator.
346. The system of clause 343, any other suitable clauses, or any combination of suitable clauses, wherein the tailoring of the lifespan management and control strategy is used to aid in the preservation or extension of the state-of-health, age, and/or lifespan of the one or more power sources.
347. The system of clause 180, any other suitable clauses, or any combination of suitable clauses, wherein the lifespan management and control strategy results in the vehicle and/or powertrain using one or more power sources as a primary power source.
348. The system of clause 180, any other suitable clauses, or any combination of suitable clauses, wherein the lifespan management and control strategy results in a switch in power sources.
349. The system of clause 348, any other suitable clauses, or any combination of suitable clauses, wherein the switch in power sources may be from using the fuel cell or fuel cell stack as the primary power source to using the battery as the primary power source when the vehicle and/or powertrain receives instructions from the controller that a switch of power sources is necessary and/or recommended to preserve, maintain, and/or extend the life of one or all of the power sources.
350. The system of clause 180, any other suitable clauses, or any combination of suitable clauses, wherein the lifespan management and control strategy results in using the fuel cell or fuel cell stack as the primary power source for one portion of a trip or route and the battery as the primary power source in another portion of the trip or route.
351. The system of clause 180, any other suitable clauses, or any combination of suitable clauses, wherein the lifespan management and control strategy includes one or more lifespan management and control strategies.
352. The system of clause 351, any other suitable clauses, or any combination of suitable clauses, wherein the one or more lifespan management and control strategies independently communicate to each of the one or more power sources or each primary power sources.
353. The system of clause 351, any other suitable clauses, or any combination of suitable clauses, wherein a first lifespan management and control strategy is generated and implemented to selectively control a first primary power source or the fuel cell or fuel cell stack and/or a second lifespan management and control strategy is generated and implemented to selectively control a second primary power source or the battery.
354. The system of clause 353, any other suitable clauses, or any combination of suitable clauses, wherein additional lifespan management and control strategies are generated and implemented to selectively control additional primary power sources.
355. The system of clause 180, any other suitable clauses, or any combination of suitable clauses, wherein the lifespan management and control strategy alters, decreases, increases, negates, or enhances the functionality of the one or more power sources, or the one or more power sources not identified as the primary power source or are identified not to be the primary pour source.
356. The system of clause 180, any other suitable clauses, or any combination of suitable clauses, wherein the readiness, application, and/or implementation of the lifespan management and control strategy includes preparing for, accounting for, and/or managing the time required for a start-up sequence, shutdown sequence, and/or sufficient charging of the one or more power sources, the fuel cell, fuel cell stack, and/or the battery in the vehicle and/or powertrain.
357. The system of clause 356, any other suitable clauses, or any combination of suitable clauses, wherein the start-up sequence or shutdown sequence requires about 30 seconds to about 30 minutes, from about 30 seconds to about 5 minutes in non-freezing conditions, from about 30 seconds to about 2 minutes in non-freezing conditions, from about 1 minute to about 2 minutes in non-freezing conditions, from about 30 seconds to about 15 minutes in freezing conditions, from about 30 seconds to about 10 minutes in freezing conditions, any specific time or variable times or ranges within the above ranges.
358. The system of clause 180, any other suitable clauses, or any combination of suitable clauses, wherein the power output for the fuel cell and/or the one or more power sources is driven by automated control.
359. The system of clause 358, any other suitable clauses, or any combination of suitable clauses, wherein the automated control of the power output of the fuel cell and/or the one or more power sources is based on the lifespan management and control strategy.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third", and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and can include electrical connections or couplings, whether direct or indirect. Direct connection and/or coupling can include such connections and/or couplings where no intermittent connection or component is present between two endpoints, components or items. Indirect connection and/or coupling can include where there is one or more intermittent or intervening connections and/or couplings present between respective endpoints, components or items.

Moreover, unless explicitly stated to the contrary, embodiments "comprising", "including", or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of controlling the lifespan of one or more power sources, the method comprising:
   receiving one or more real-time inputs into a processor, the one or more real-time inputs including travel distance or travel conditions, generating a lifespan management and control strategy by the processor using the one or more real-time inputs, the lifespan management and control strategy comprising an estimated present state-of-health and an estimated lifespan of the one or more power sources, communicating the lifespan management and control strategy by the processor to a power source controller, controlling power output of the one or more power sources by the power source controller based on the lifespan management and control strategy, wherein the one or more power sources are selected from a fuel cell, a battery, and a combination thereof, and wherein generating the lifespan management and control strategy comprises conducting an online-offline procedure including starting up one of the one or more power sources, powering the one of the one or more power sources to be operational at a first power level, allowing the one of the one or more power sources to run for a first time period at the first power level, powering the one of the one or more power sources to be operational at a second power level, and allowing the one of the one or more power sources to run for a second time period at the second power level.

2. The method of claim 1, wherein the one or more power sources are situated on, configured to be located on, or attached to a vehicle or powertrain.

3. The method of claim 2, wherein the vehicle or powertrain is an automobile, a truck, an aircraft, a vessel, a train, a locomotive, a bus, or mining equipment.

4. The method of claim 1, wherein the fuel cell is a solid oxide fuel cell or a proton exchange membrane fuel cell.

5. The method of claim 1, wherein generating the lifespan management and control strategy comprises estimating the present state-of-health of the one or more power sources.

6. The method of claim 1, wherein conducting the online-offline procedure comprises estimating the estimated present state-of-health of the one or more power sources.

7. The method of claim 6, wherein estimating the estimated present state-of-health of the one or more power sources comprises generating a trend line.

8. The method of claim 7, wherein the trend line reflects the estimated lifespan of the one or more power sources.

9. The method of claim 1, wherein controlling the power output of the one or more power sources by the power source controller comprises delivering instructions to the one or more power sources.

10. The method of claim 1, wherein controlling the power output of the one or more power sources by the power source controller comprises extending the lifespan of the one or more power sources.

11. A system for controlling the lifespan of a power source, the system comprising:

a processor, one or more real-time inputs based on current data, the one or more real-time inputs including travel distance or travel conditions, a power source controller, and one or more power sources, wherein the one or more power sources are situated on, configured to be located on, or attached to a vehicle or powertrain, wherein the processor receives the one or more real-time inputs, uses the one or more real-time inputs to generate a lifespan management and control strategy comprising the one or more real-time inputs, an estimated present state-of-health and an estimated lifespan of the one or more power sources, and communicates the lifespan management and control strategy to the power source controller, wherein the power source controller controls power output for the one or more power sources based on the lifespan management and control strategy, and wherein the processor generates the lifespan management and control strategy by conducting an online-offline procedure including starting up one of the one or more power sources, powering the one of the one or more power sources to be operational at a first power level, allowing the one of the one or more power sources to run for a first time period at the first power level, powering the one of the one or more power sources to be operational at a second power level, and allowing the one of the one or more power sources to run for a second time period at the second power level.

12. The system of claim 11, wherein each of the one or more power sources includes a separate individual controller for controlling that power source.

13. The system of claim 12, wherein the individual controllers for each of the one or more power sources separately cooperates with the power source controller to control the power output for the one or more power sources.

14. The system of claim 11, wherein the power output for the one or more power sources is driven by automated control.

15. The system of claim 14, wherein the automated control of the power output of the one or more power sources is based on the lifespan management and control strategy.

16. The system of claim 11, wherein the vehicle or powertrain is an automobile, a truck, an aircraft, a vessel, a train, a locomotive, a bus, or mining equipment.

17. The system of claim 11, wherein the one or more power sources are selected from a fuel cell, a battery, and a combination thereof, and wherein the fuel cell is a solid oxide fuel cell or a proton exchange membrane fuel cell.

18. The method of claim 1, wherein the one or more real-time inputs include weather data, road conditions, sea conditions, an age of the one or more power sources, or a combination thereof.

19. The system of claim 11, wherein the one or more real-time inputs include weather data, road conditions, sea conditions, an age of the one or more power sources, or a combination thereof.

* * * * *